United States Patent
Lee et al.

(10) Patent No.: US 9,526,016 B2
(45) Date of Patent: Dec. 20, 2016

(54) COMPUTING SYSTEM WITH FEEDBACK MECHANISM AND METHOD OF OPERATION THEREOF

(71) Applicant: Samsung Electronics Co., Ltd., Suwon-si, Gyeonggi-Do (KR)

(72) Inventors: Jungwon Lee, San Diego, CA (US); Jung Hyun Bae, San Diego, CA (US); Yingqun Yu, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/610,472

(22) Filed: Jan. 30, 2015

(65) Prior Publication Data

US 2015/0236734 A1 Aug. 20, 2015

Related U.S. Application Data

(60) Provisional application No. 61/939,881, filed on Feb. 14, 2014.

(51) Int. Cl.
*H04B 17/00* (2015.01)
*H04W 24/02* (2009.01)
(Continued)

(52) U.S. Cl.
CPC ........... *H04W 24/02* (2013.01); *H04B 7/0417* (2013.01); *H04L 1/0026* (2013.01)

(58) Field of Classification Search
CPC .. H04W 24/00; H04W 24/10; H04W 72/0486; H04W 28/22; H04W 16/14; H04W 48/16; H04W 72/042; H04W 72/0426; H04W 72/082; H04W 72/1226; H04W 74/00; H04W 36/08; H04B 17/345; H04B 17/318; H04B 17/327; H04B 1/1027; H04B 17/24; H04B 17/382; H04B 17/391; H04B 1/7097; H04L 5/0073; H04L 2025/03802; H04L 25/03343; H04L 1/00; H04L 1/0036; H04L 25/067

See application file for complete search history.

(56) References Cited

U.S. PATENT DOCUMENTS 6,687,315 B2 2/2004 Keevill et al.
7,620,370 B2 11/2009 Barak et al.
(Continued)

OTHER PUBLICATIONS

Long Gao, "Heterogeneous Networks—Theory and Standardization in LTE", IEEE WCNC 2013.
(Continued)

*Primary Examiner* — Golam Sorowar
(74) *Attorney, Agent, or Firm* — IP Investment Law Group

(57) ABSTRACT

A computing system includes: an inter-device interface configured to communicate receiver signal corresponding to serving signal contemporaneous with interference signal from an interference source at an interference-aware receiver; a communication unit, coupled to the inter-device interface, configured to: determine a serving-interference metric for describing capability of the interference-aware receiver associated with serving communication capacity and interference communication capacity, and generating feedback signal including the serving-interference metric for communicating the feedback signal to a node device.
An embodiment includes: an inter-device interface configured to communicate feedback signal including a serving-interference metric for representing an interference-aware receiver processing receiver signal corresponding to serving signal contemporaneous with interference signal; a communication unit, coupled to the inter-device interface, configured to: generate a communication rate profile based on the
(Continued)

serving-interference metric for describing the interference-aware receiver, and determine serving detail based on the communication rate profile for communicating serving content to the interference-aware receiver.

18 Claims, 7 Drawing Sheets

(51) Int. Cl.
*H04B 7/04* (2006.01)
*H04L 1/00* (2006.01)

(56) References Cited

U.S. PATENT DOCUMENTS

| | | | |
|---|---|---|---|
| 8,077,796 B2 | 12/2011 | Qi et al. | |
| 8,098,751 B2 | 1/2012 | Shattil et al. | |
| 8,140,950 B2 | 3/2012 | Mantha et al. | |
| 8,306,146 B2 | 11/2012 | Heath et al. | |
| 8,432,988 B2 | 4/2013 | Sanayei | |
| 2010/0067461 A1* | 3/2010 | Kwak | H04L 1/0026 370/329 |
| 2010/0233962 A1* | 9/2010 | Johansson | H04W 52/343 455/63.1 |
| 2012/0076040 A1 | 3/2012 | Hoshino et al. | |
| 2012/0083201 A1 | 4/2012 | Troung et al. | |
| 2012/0113897 A1 | 5/2012 | Thiele et al. | |
| 2012/0176996 A1 | 7/2012 | Kim et al. | |
| 2013/0155967 A1 | 6/2013 | Kang et al. | |
| 2013/0156139 A1* | 6/2013 | Lee | H04L 1/0048 375/341 |
| 2013/0229990 A1* | 9/2013 | Fan | H04W 72/0486 370/329 |
| 2013/0286881 A1* | 10/2013 | Ding | H04W 8/24 370/252 |
| 2013/0322276 A1 | 12/2013 | Pelletier et al. | |
| 2014/0036806 A1 | 2/2014 | Chen et al. | |
| 2014/0044061 A1 | 2/2014 | Yue et al. | |
| 2014/0057573 A1* | 2/2014 | Dawid | H04B 7/0617 455/67.13 |
| 2014/0093005 A1 | 4/2014 | Xia et al. | |
| 2014/0112248 A1* | 4/2014 | Bergman | H04B 7/024 370/328 |
| 2014/0364064 A1 | 12/2014 | Kwon et al. | |

OTHER PUBLICATIONS

Mathew Baker, "LTE-Advanced Physical Layer", 3GPP 2009.
"LTE Channel State Information (CSI)", Agilent Technologies, 2012.

* cited by examiner

COMPUTING SYSTEM WITH FEEDBACK MECHANISM AND METHOD OF OPERATION THEREOF

CROSS-REFERENCE TO RELATED APPLICATION(S)

This application claims the benefit of U.S. Provisional Patent Application Ser. No. 61/939,881 filed Feb. 14, 2014, and the subject matter thereof is incorporated herein by reference thereto.

TECHNICAL FIELD

An embodiment of the present invention relates generally to a computing system, and more particularly to a system with feedback mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, as well as computational complexities rising from numerous possible formats for communicated information, which affect the quality and speed of the accessible data.

Thus, a need still remains for a computing system with feedback mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: an inter-device interface configured to communicate a receiver signal corresponding to serving signal contemporaneous with an interference signal from an interference source at an interference-aware receiver; a communication unit, coupled to the inter-device interface, configured to: determine a serving-interference metric for describing capability of the interference-aware receiver associated with serving communication capacity and interference communication capacity, and generating a feedback signal including the serving-interference metric for communicating the feedback signal to a node device.

An embodiment of the present invention provides a method of operation of a computing system including: communicating a receiver signal corresponding to serving signal contemporaneous with an interference signal from an interference source at an interference-aware receiver; determining a serving-interference metric with a communication unit for describing capability of the interference-aware receiver associated with serving communication capacity and interference communication capacity; and generating a feedback signal including the serving-interference metric for communicating the feedback signal to a node device.

An embodiment of the present invention provides a computing system, including: an inter-device interface configured to communicate a feedback signal including a serving-interference metric for representing an interference-aware receiver processing a receiver signal corresponding to serving signal contemporaneous with an interference signal; a communication unit, coupled to the inter-device interface, configured to: generate a communication rate profile based on the serving-interference metric for describing the interference-aware receiver, and determine serving detail based on the communication rate profile for communicating serving content to the interference-aware receiver.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
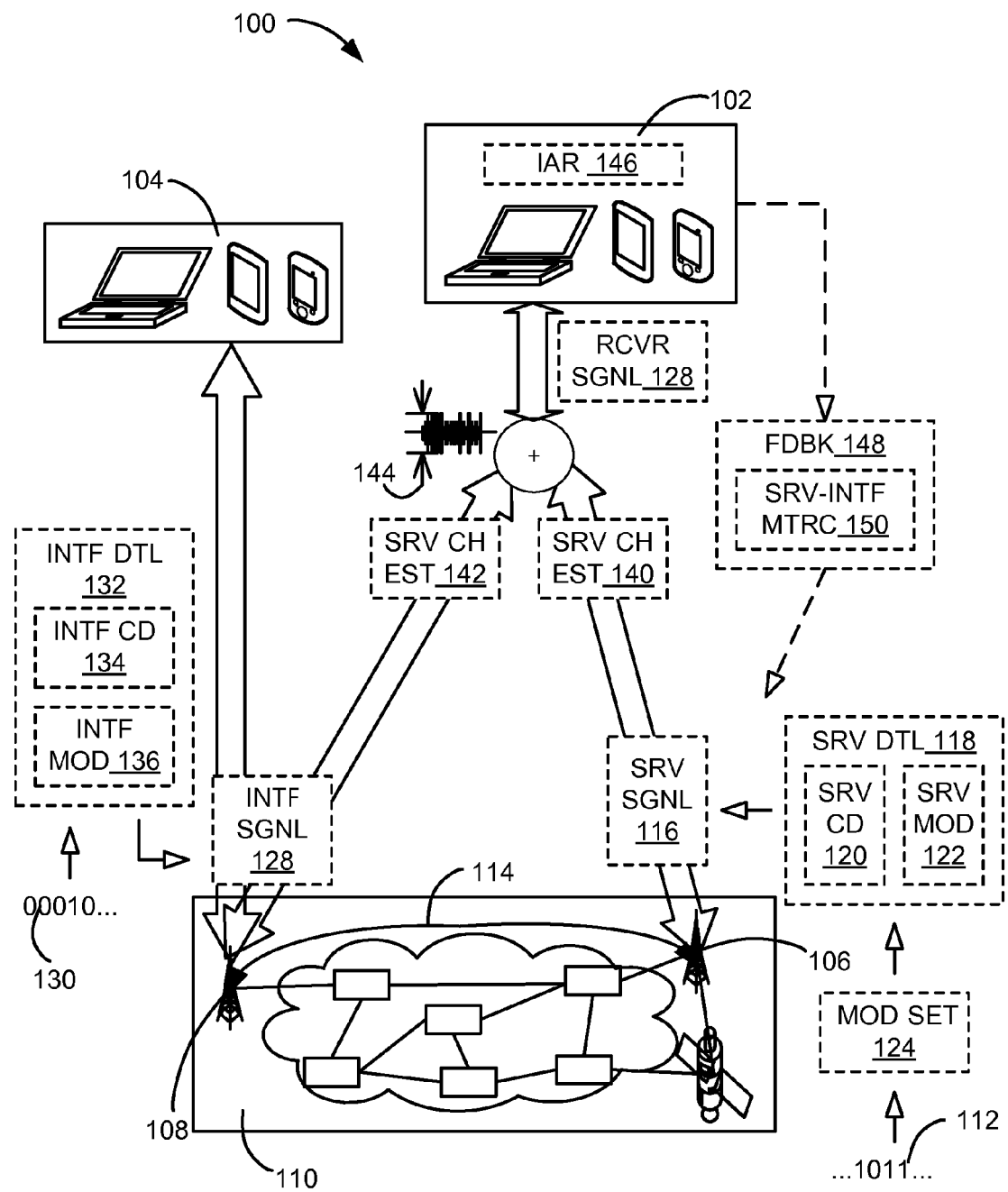
FIG. 1 is a computing system with feedback mechanism in an embodiment of the present invention.

The following embodiments of the present invention can be used to communicate serving-interference metric between a node device and a user device in response to receiver signal at the user device. The serving-interference metric can represent ability or capability of interference-aware receiver to process for serving content coexisting with interference signal in the receiver signal.

The serving-interference metric can be based on receiver capacity function at the interference-aware receiver. The serving-interference metric can be used to determine communication rate profile at the node device for representing the user device. The serving-interference metric can be for determining serving detail for controlling serving signal communicating the serving content, determining interference detail for controlling the interference signal, or a combination thereof.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "block" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes manipulating signal and corresponding data, such as filtering, detecting, decoding, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a computing system 100 with feedback mechanism in an embodiment of the present invention. The computing system 100 can include a first user device 102, a second user device 104, a first node device 106, a second node device 108, or a combination thereof.

The first user device 102, the second user device 104, or a combination thereof can include a client device or a personal device, a server device, a communication device, or a combination thereof. The first user device 102, the second user device 104, or a combination thereof can be a mobile device including a cellular phone or a notebook computer, or a wearable device, or a combination thereof connected to a network 110. The first user device 102, the second user device 104, or a combination thereof can communicate using wired communication mechanism or a wireless communication mechanism. The first user device 102, the second user device 104, or a combination thereof can include a user equipment (UE).

The network 110 is a system of wired or wireless communication devices or means that are connected to each other for enabling communication between devices. The network 110 can include a wire, a transmitter, a receiver, an antenna, a tower, a base station, a coordinating device, a repeater, telephone network, a server, a client device, or a combination thereof. Also for example, the network 110 can include a wireless cellular network. Also for example, the network 110 can also include a combination of routers, cables, computers, servers, and client devices for various sized area networks.

The computing system 100 can include the first node device 106, the second node device 108, or a combination thereof for directly or indirectly linking and communicating with the first user device 102, the second user device 104, or a combination thereof. The network 110 can include the first node device 106, the second node device 108, or a combination thereof for accessing the network 110.

The first node device 106, the second node device 108, or a combination thereof can receive wireless signals from the first user device 102, the second user device 104, or a combination thereof, transmit signals thereto, process signals, or a combination thereof. The first node device 106, the second node device 108, or a combination thereof can also communicate or relay signals, such as by sending or receiving signals, between other base stations, components within the network 110, or a combination thereof. The first node device 106 and the second node device 108 can similarly communicate with each other or other node devices.

The first user device 102, the second user device 104, or a combination thereof can be connected to the network 110 through the first node device 106, the second node device 108, or a combination thereof. For example, the first node device 106, the second node device 108, or a combination thereof can include a user device or a mobile device acting as a base station, an access point, a hub, a hotspot, a tethering point, a peer-to-peer network component, or a combination thereof. Also for example, the first node device 106, the second node device 108, or a combination thereof can include a base station.

Also for example, the first node device 106, the second node device 108, or a combination thereof can include a communication device or a processing component included in or with a cell tower, a wireless router, an antenna, or a combination thereof being used to communicate with the first user device 102, the second user device 104, or a combination thereof. Also for example, the first node device 106, the second node device 108, or a combination thereof can include an evolved node B (eNodeB) as an element in an air interface representing evolved UMTS terrestrial radio access (e-UTRA).

The first node device 106, the second node device 108, or a combination thereof can further include a coordinating device. The first node device 106, the second node device 108, or a combination thereof can include the base station, the coordination device, or a combination thereof.

The first node device 106, the second node device 108, or a combination thereof can coordinate activities of multiple transmitters, locations or areas, cells, or a combination thereof. For example, first node device 106, the second node device 108, or a combination thereof including the coordinating device can control simultaneous transmission of multiple communications for multiple cells, multiple base stations, or a combination thereof.

The first user device 102, the second user device 104, or a combination thereof can connect to and communicate with other devices, such as each other, other mobile devices, servers, computers, telephones, or a combination thereof. For example, the first user device 102, the second user device 104, or a combination thereof can communicate with other devices by transmitting signals, receiving signals, processing signals, or a combination thereof. Also for example, the first user device 102, the second user device 104, or a combination thereof can communicate by displaying a serving content 112 in the signals, audibly recreating sounds according to the serving content 112 in the signals, processing according to the serving content 112, such as storing an application or updating an operating system, or a combination thereof.

The first node device 106, the second node device 108, or a combination thereof can be used to wirelessly exchange signals for communication, including voice signals of a telephone call or data representing a webpage and interactions therewith. The first node device 106, the second node device 108, or a combination thereof can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The network 110 can further include a node link 114. The node link 114 can include a method, a process, or a mechanism for directly communicating information between node devices or access points.

For example, the node link 114 can include the coordinating device for managing the first node device 106, the second node device 108, or a combination thereof. Also for example, the node link 114 can include a wired or wireless communication channel or connection, exchanged information, communication protocol, a method or a process for further processing the exchanged information, or a combination thereof between the first node device 106 and the second node device 108. As a more specific example, the node link 114 can include a back-haul channel for communicating between base stations.

The computing system 100 can process the serving content 112 for communication. The computing system 100 can generate a serving signal 116 from processing the serving content 112. For example, the first node device 106 can generate a serving signal 116 intended for communication with the first user device 102. Also for example, the second node device 108 can generate the serving signal 116 intended for communication with the second user device 104.

The serving signal 116 can include the actual transmitted information representing or corresponding to the serving content 112. The serving signal 116 can include a wireless signal, a wired signal, or a combination thereof. The serving signal 116 can include signals according to various communication formats, such as according to 4G standards, 3G standards, OFDM, CDMA, TDMA, FDMA, single-input single-output (SISO), multiple-input multiple-output (MIMO), or a combination thereof.

The computing system 100 can process the serving content 112 according to various methods, processes, or parameters. The computing system 100 can utilize serving detail 118 for representing the processing for the serving content 112 in generating the serving signal 116. For example, the serving detail 118 can represent modulation, coding, or a combination thereof for generating the serving signal 116. As a more specific example, the serving detail 118 can include modulation-coding scheme (MCS).

The serving detail 118 can include serving code 120, serving modulation 122, or a combination thereof. The serving code 120 is a description or a setting representing a process or a method utilized for coding or decoding the serving content 112 in processing the serving signal 116. The first user device 102, the second user device 104, the first node device 106, the second node device 108, or a combination thereof can format or process the serving content 112, the serving signal 116, or a combination thereof according to the serving code 120.

For example, the serving code 120 can describe or represent turbo coding scheme or polar coding scheme used to code the serving content 112 for generating and transmitting the serving signal 116. Also for example, the serving code 120 can describe or represent the coding rate for generating and transmitting the serving signal 116. The computing system 100 can utilize the serving code 120 to decode in recovering the serving content 112.

The serving modulation 122 is a description or a setting representing a constellation or a set of possible values for communicating information utilized for processing the serving content 112 and the serving signal 116. The first user device 102, the second user device 104, the first node device 106, the second node device 108, or a combination thereof can format or process the serving content 112, the serving signal 116, or a combination thereof according to the serving modulation 122. For example, the serving modulation 122 can include quadrature amplitude modulation (QAM), phase-shift keying (PSK), or a derivation thereof, such as 64 QAM or quadrature PSK (QPSK).

The serving modulation 122 can be selected from a modulation set 124. The modulation set 124 is a grouping of possible modulation schemes available to the computing system 100 or a device therein. The computing system 100 or a device therein can select the serving modulation 122 from within the modulation set 124. The modulation set 124 can include possible values, settings, schemes, or a combination thereof for the serving modulation 122. The modulation set 124 can be predetermined by the computing system 100, communication standard, or a combination thereof.

One or more devices in the computing system 100 can receive communication signal unintended for the receiving device. The computing system 100 can include a particular device receiving receiver signal 126. The receiver signal 126 can include data or information available to or captured at a particular device. The receiver signal 126 can correspond to the serving signal 116.

For example, the first user device 102 can receive the receiver signal 126 corresponding to the serving signal 116 from the first node device 106 intended for the first user device 102. Also for example, the second user device 104 can receive the receiver signal 126 corresponding to the serving signal 116 from the second node device 108 intended for the second user device 104.

The receiver signal 126 can further include data, information, influences, or a combination thereof unintended for the receiving device. The receiver signal 126 can include interference signal 128. The interference signal 128 can include communicated information not intended for the device receiving and processing the interference signal 118 at the time of the reception.

For example, the serving signal 116 transmitted by the second node device 108 and intended for the second user device 104 can be received as the interference signal 128 for the first user device 102. Also for example, the serving signal 116 transmitted by the first node device 106 and intended for the first user device 102 can be received as the interference signal 128 for the second user device 104.

The interference signal 128 can be similar to the serving signal 116 but unintended for the receiving device. For example, the interference signal 128 can represent interference content 130 similar to the serving content 112 for the serving signal 116. Also for example, the interference signal 128 be based on interference detail 132, such as including interference code 134, interference modulation 136, or a combination thereof similar to the serving detail 118, the serving code 120, the serving modulation 122, or a combination thereof.

The interference content 130 can be the data or information intended for communication with a device other than the receiving device. The interference content 130 can be coded according to the interference code 134, such as for a coding scheme or a coding rate. The interference content 130 can be modulated according to the interference modulation 136, such as for QPSK or 16 QAM. The interference modulation 136 can also be selected from the modulation set 124 similar to the serving modulation 122.

The serving signal 116, the interference signal 128, or a combination thereof can be altered or changed while traversing communication channels. The communication channels 120 can include environments or connections between devices exchanging signals. The communication channels can each include be a direct link between corresponding devices, such as between the UE and the node device.

For example, the communication channels can include a serving channel between the first user device 102 and the first node device 106, between the second user device 104 and the second node device 108, or a combination thereof. Also for example, the communication channels can include an interference channel between the first node device 106 and the second user device 104, between the second node device 108 and the first user device 102, or a combination thereof.

Each communication channel can include repeaters, amplifiers, or a combination thereof there-between for an indirect link. Each communication channel can further include a specific instance or value of communication detail, such as frequency, time slot, packet designation, transmission rate, channel code, or a combination thereof used for transmitting signals between intended devices.

Each communication channel can further include physical characteristics unique to geographic locations associated with the corresponding devices. The communication channel can include structures or influences, such as fading characteristics of signals or causes for unique delay or reflection of signals, affecting the transmission of wireless signals. The communication channels can distort or alter the signals traversing therein.

Each transmitted signal can traverse the communication channel and be received as the receiver signal or a portion therein at a particular device. The serving signal 116 can traverse the serving channel, the interference signal 128 can traverse the interference channel, or a combination thereof.

For illustrative purposes, the computing system 100 will be described as receiving the receiver signal 126 at the first user device 102. However, it is understood that the computing system 100 can receive the receiver signal 126 at the first user device 102, the second user device 104, the first node device 106, the second node device 108, the coordinating device, or a combination thereof.

The computing system 100 can calculate a channel estimate, such as a serving channel estimate 140, an interference channel estimate 142, or a combination thereof, for the communication channel. The serving channel estimate 140 can represent a change, an influence, an alteration, or a combination thereof caused by the serving channel for the serving signal 116. The serving channel estimate 140 can include a factor, a delay, or a combination thereof representing changes or alterations for the serving signal 116.

The interference channel estimate 142 can represent a change, an influence, an alteration, or a combination thereof caused by the interference channel for the interference signal 128. The interference channel estimate 142 can include a factor, a delay, or a combination thereof representing changes or alterations for the interference signal 128.

The receiver signal 126 can further include a noise parameter. The noise parameter can include an error or a deviation in the data included in the receiver signal 126. The noise parameter can represent the error or the deviation caused by a processing channel or a route for the data, hardware components processing signals, background noise, or a combination thereof.

The computing system 100 can calculate a noise measure 144 for representing the noise parameter. The noise measure 144 can be a representation of the error or the deviation in the data included in the receiver signal 126. The noise measure 144 can include a statistical measure of the noise parameter. For example, the noise measure 144 can include deviation, variation, magnitude, spread, covariance, power, distancing, density, power, or a combination thereof for the values in the noise parameter.

The noise measure 144 can also represent changes in the signal or the data due to hardware component limitations, such as tolerance levels or cross-talk between components. The noise measure 144 can be independent of the transmit symbols. The noise measure 144 can represent the error or the deviation additive in nature and have a random Gaussian or Rayleigh distribution for the changes. The noise measure 144 can be colored or white.

The communication within the computing system 100 can be represented as:

$$y_1 = H_{1,1}x_1 + H_{1,2}x_2 + z_1,$$

$$y_2 = H_{2,1}x_1 + H_{2,2}x_2 + z_2. \quad \text{Equation (1)}.$$

The receiver signal 126 for the first user device 102 can be represented as '$y_1$'. The receiver signal 126 for the second user device 104 can be represented as '$y_2$'. The serving signal 116 intended for the first user device 102 can be represented as '$x_1$'. The serving signal 116 intended for the second user device 104 can be represented '$x_2$'.

The serving channel estimate 140 for the first user device 102 can be represented as '$H_{1,1}$' and the interference channel estimate 142 for the first user device 102 can be represented as '$H_{1,2}$'. The serving channel estimate 140 for the second user device 104 can be represented as '$H_{2,2}$' and the interference channel estimate 142 for the second user device 104 can be represented as '$H_{2,1}$'. The noise parameter for the first user device 102 can be represented as '$z_1$' and the noise parameter for the second user device 104 can be represented as '$z_2$'. The noise measure 144 can be represented as '$\sigma^2$'.

The computing system 100 can include an interference-aware receiver 146 (IAR) for processing the receiver signal 126. For example, the first user device 102, the second user device 104, the first node device 106, the second node device 108, or a combination thereof can include the interference-aware receiver 146.

The interference-aware receiver 146 is a device or a portion thereof configured to process and utilize the interference content 130 from the interference signal 128 or a portion corresponding thereto for the receiver signal 126 in processing for the serving content 112. For example, the interference-aware receiver 146 can process the interference signal 128 and identify the interference content 130 in processing for the serving content 112 from the receiver signal 126. Also for example, the interference-aware receiver 146 can exclude receivers whitening the interference signal 128 without specifically identifying the interference content 130 therein.

The interference-aware receiver 146 can include an interference aware detector, decoder, or a combination thereof. The interference-aware receiver 146 can further include a joint detector, decoder, or a combination thereof configured to recognize, whiten, cancel or remove, detect, decode, or a combination thereof for the interference signal 128 in processing the serving signal 116.

For example, the interference-aware receiver 146 can detect, decode, or a combination thereof for the interference signal 128. Also for example, the interference-aware receiver 146 can determine a bit, a symbol, an estimate thereof, or a combination thereof corresponding to the interference content 130.

The computing system 100 can utilize the interference-aware receiver 146 by determining information, such as formatting or control information, describing the unintended or unexpected signal. For example, the computing system 100 can communicate the interference detail 132 to the first user device 102 through the first node device 106, the node link 114, or a combination thereof. Also for example, the computing system 100 can estimate the interference detail 132 with the interference-aware receiver 146.

The interference-aware receiver 146 can use the interference content 130 in processing for the serving signal 116 or the serving content 112 corresponding thereto. For example, the interference-aware receiver 146 can use the bit, the symbol, the estimate thereof, or a combination thereof corresponding to the interference content 130 in determining the serving content 112 corresponding to the serving signal 116. Also for example, the interference-aware receiver 146 can jointly detect, jointly decode, or a combination thereof for both the interference signal 128 and the serving signal 116, or successively cancel the interference signal 128 in processing for the serving content 112 of the serving signal 116.

For illustrative purposes, the computing system 100 will be described from the perspective of the first user device 102 and the first node device 106 intending to communicate with each other using the serving signal 116 and receiving the interference signal 128 intended between the second user device 104 and the second node device 108. However, it is understood that the computing system 100 can utilize the below described processes for communicating between or from the perspective of the first user device 102, the second user device 104, the first node device 106, the second node device 108, or a combination thereof.

Also for illustrative purposes, the interference signal 128 is described as communication between the second user device 104 and the second node device 108. However, it is understood that the interference signal 128 can be any information unintended for the receiving device at that time, such as from the first user device 102, the second user device 104, the first node device 106, the second node device 108, or a combination thereof.

The computing system 100 can further utilize feedback signal 148. The feedback signal 148 can include information describing current communication condition in association with future communication settings. The feedback signal 148 can describe the communication channel, communication environment, information regarding the interference, or a combination thereof associated with the receiver signal 126 perceived, experienced, or determined by the receiving device. The feedback signal 148 can include channel quality information (CQI).

The feedback signal 148 can further indicate a rate associated with the receiving device for representing desired or capable communication speed. The computing system 100 can use the feedback signal 148 to set or adjust the communication rate, the serving detail 118, the interference detail 132, coding or modulation therein, or a combination thereof.

The feedback signal 148 can include a serving-interference metric 150. The serving-interference metric 150 is a representation of capability of the interference-aware receiver 146 with respect to interference.

The serving-interference metric 150 can describe capability or capacity of the receiving device including the interference-aware receiver 146 to process the serving signal 116 or the serving content 112 for various or specific environments or conditions regarding the interference signal 128. The serving-interference metric 150 can further describe capability or capacity of the receiving device with respect to the serving detail 118, the interference detail 132, the modulation or coding therein, or a combination thereof.

It has been discovered that the serving-interference metric 150 provides increased efficiency and increase in overall communication speed for the computing system 100. The serving-interference metric 150 can accurately describe the capability or capacity of the interference-aware receiver 146. The serving-interference metric 150 can be used to determine and set the serving detail 118, the interference detail 132, or a combination thereof in light of the interference signal 128 that balances and optimizes the communication rate for both the serving signal 116 and the interference signal 128.

For illustrative purposes, the receiver signal 126 will be described as the signal received by the first user device 102. However, it is understood that the receiver signal 126 can represent the signal received by the first node device 106, the second user device 104, or the second node device 108.

For further illustrative purposes, the computing system 100 is described as the base station communicating content to the mobile device, such as the base station transmitting and the mobile device receiving the information. However, it is understood that the mobile device can communicate content directly to each other or to the base station.

For further illustrative purposes, the computing system 100 is described as having one instance of the serving signal 116 and one instance of the interference signal 128 relative to communicating between the first user device 102 and the first node device 106. However, it is understood that the computing system 100 can experience and process for multiple interference signals and sources. The computing system 100 can coordinate the communication of signals with two or more instances of the base stations.

Figure 2:
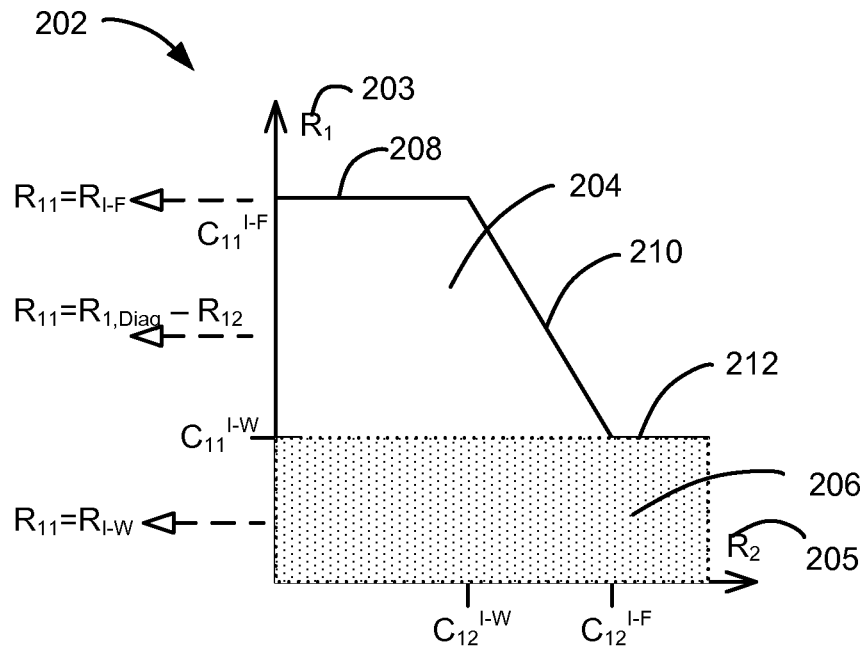
FIG. 2 is an exemplary illustration of a communication rate profile for the computing system.

Referring now to FIG. 2, therein is shown an exemplary illustration of a communication rate profile 202 for the computing system 100 of FIG. 1. The communication rate profile 202 is a characterization of capacity or ability of one or more devices exchanging information. The communication rate profile 202 can represent a communication rate, an error rate, a relationship with an interference, or a combination thereof.

For illustrative purposes, the communication rate profile 202 has been represented with a graph for abstractly describing the communication rate profile 202. However, it is understood that the communication rate profile 202 can be implemented in various ways. For example, the communication rate profile 202 can include a table, an equation, a function, a set of points or values, or a combination thereof.

The communication rate profile 202 can be for the interference-aware receiver 146 of FIG. 1. The communication rate profile 202 can describe a serving communication capacity 203, an interference communication capacity 205, an estimation thereof, a relationship there-between, or a combination thereof. For example, the serving communication capacity 203 can describe a rate of data transfer, an error rate, a bandwidth consumption, or a combination thereof for the serving signal 116.

Also for example, the interference communication capacity 205 can describe a rate of data transfer, an error rate, a bandwidth consumption, or a combination thereof for the interference signal 128. As a more specific example, the communication rate profile 202 can describe the serving communication rate achievable with the interference-aware receiver 146 when the interference communication rate is a certain value for representing a particular interference environment or condition.

Also for example, the communication rate profile 202 can include an interference-aware segment 204 in addition to an interference-whitening segment 206. The interference-whitening segment 206 can represent the capacity or ability for devices not recognizing, detecting, decoding, or a combination of processes thereof for the interference signal 128 of FIG. 1 in processing the serving signal 116 of FIG. 1. The interference-whitening segment 206 can be for the first user device 102 of FIG. 1, the second user device 104 of FIG. 1, or a combination thereof without or not utilizing the interference-aware receiver 114.

For example, the interference-whitening segment 206 can represent achievable communication rates when utilizing interference whitening process, blind interference removal process, or a combination thereof. Also for example, the interference-whitening segment 206 can represent achievable communication rates when processing the interference signal 128 as included in the noise portion.

The interference-aware segment 204 is a measurement of the overall capacity or ability to process the receiver signal 126 of FIG. 1 for a device recognizing, detecting, decoding, or a combination of processes thereof for the interference signal 128 in processing the serving signal 116. The interference-aware segment 204 can be greater than or in addition to the interference-whitening segment 206. The interference-aware segment 204 can be the measurement for the first user device 102, the second user device 104, or a combination thereof with or utilizing the interference-aware receiver 146.

For example, the interference-aware segment 204 can represent achievable communication rates when utilizing the interference-aware receiver 146, such as joint-detection of serving and interference data or successive decoding of serving data based on recognizing the interference data. Also for example, the interference-aware segment 204 can represent the improvement in the communication rate resulting from distinguishing the interference signal 128 from the noise portion and processing for the serving signal 116 accordingly.

The interference-aware segment 204 can be based on the interference communication capacity 205, the serving communication capacity 203, or a combination thereof. The interference communication capacity 205, or an estimate thereof, can be represented along a horizontal direction or axis. The serving communication capacity 203, or an estimate thereof, can be represented along a vertical direction or axis. The serving communication capacity 203 can remain constant, decrease, or a combination thereof as the interference communication capacity 205 increases.

The interference-aware segment 204 can be based on the interference signal 128 or processing thereof as associated with the interference-aware receiver 146. The interference-aware segment 204 can include an interference-free rate 208, a partial-recognition rate 210, an interference-whitening rate 212, or a combination thereof.

The interference-free rate 208 is a representation of overall processing capacity or ability based on fully recognizing, detecting, decoding, or a combination of processes thereof for the interference signal 128. The interference-free rate 208 can be a maximum value or limit or a range of values up to and including the maximum value or limit for the serving communication capacity 203.

The partial-recognition rate 210 is a representation of overall processing capacity or ability based on partially recognizing, detecting, decoding, or a combination of processes thereof for the interference signal 128. The partial-recognition rate 210 can be a combination of an ability to recognize, decode, detect, or a combination thereof for the interference signal 128, represented as '$R_{12}$', and a relationship between the interference-free rate 208 and the interference-whitening rate 212, represented as '$R_{1,Diag}$'. The partial-recognition rate 210 can be the processing capability for the interference signal 128 for the first user device 102, adjusted by the interference-free rate 208 and the interference-whitening rate 212.

The interference-whitening rate 212 is a representation of overall processing capacity or ability based on not recognizing, detecting, decoding, or a combination of processes thereof for the interference signal 128. The interference-whitening rate 212 can be a minimum value or limit or a range of values from and including the minimum value or limit for the serving communication capacity 203.

The computing system 100 can include the communication rate profile 202 at the first user device 102, the second user device 104, the first node device 106, the second node device 108, or a combination thereof. The computing system 100 can further include the communication rate profile 202 describing the first user device 102, the second user device 104, or a combination thereof including the interference-aware receiver 146.

For example, the computing system 100 can generate the communication rate profile 202 with the first node device 106, the second node device 108, or a combination thereof for describing the first user device 102, the second user device 104, or a combination thereof. The computing system 100 can generate the communication rate profile 202 based on one or more instances of the feedback signal 148 of FIG. 1 or the serving-interference metric 150 of FIG. 1 from the first user device 102, the second user device 104, or a combination thereof.

Figure 3:
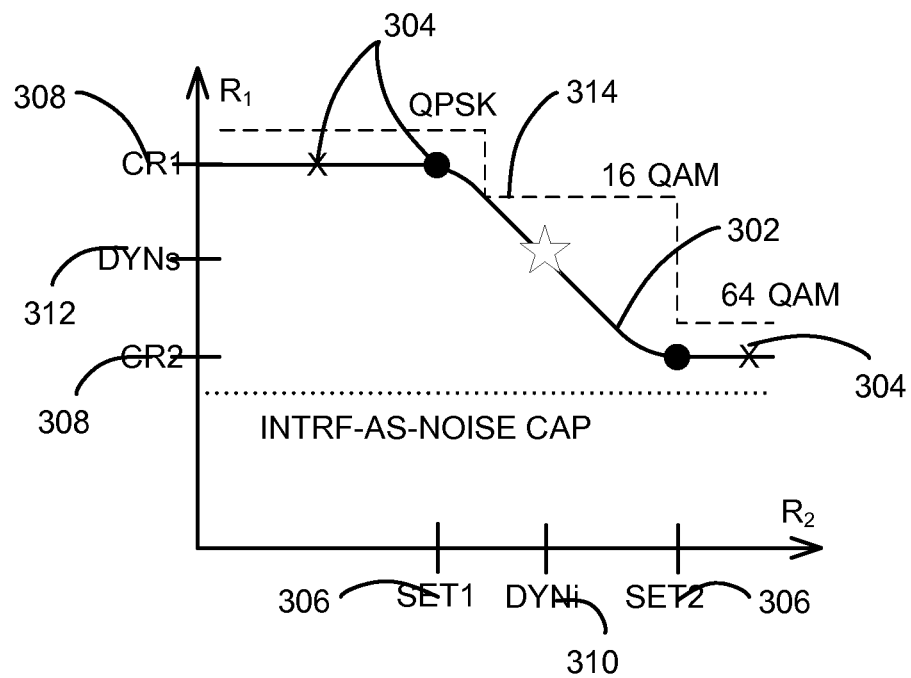
FIG. 3 is an exemplary illustration of a receiver capacity function for the computing system.

Referring now to FIG. 3, therein is shown an exemplary illustration of a receiver capacity function 302 for the computing system 100 of FIG. 1. The receiver capacity function 302 is a mathematical function or description for capacity or ability of one or more devices exchanging information. The receiver capacity function 302 can include a nonnegative function representing the receiver under a given channel condition.

The receiver capacity function 302 can represent or approximate the communication rate profile 202 of FIG. 2. The receiver capacity function 302 can be identical to the communication rate profile 202 or similar to the communication rate profile 202 with minor differences from estimations or approximations. The receiver capacity function 302 can represent a communication rate, an error rate, a relationship with an interference, or a combination thereof.

The receiver capacity function 302 can be associated with one or more possible instances of the serving modulation 122 of FIG. 1, the interference modulation 136 of FIG. 1, or a combination thereof. The serving communication capacity 203 of FIG. 2, the interference communication capacity 205 of FIG. 2, or a combination thereof can be based on or depend on the serving modulation 122, the interference modulation 136. The receiver capacity function 302 can be associated with the modulation set 124 of FIG. 1.

For example, the receiver capacity function 302 can be a function of the interference communication capacity 205 or the communication rate for the interference signal 128 of FIG. 1, the interference modulation 136, or a combination thereof. Also for example, the receiver capacity function 302 can be a function the serving communication capacity 203 or the communication rate for the serving signal 116 of FIG. 1, the serving modulation 122, or a combination thereof.

The receiver capacity function 302 can similarly be associated with different possible values for the serving code 120 of FIG. 1, the interference code 134 of FIG. 1, or a combination thereof. For example, the serving communication capacity 203, the interference communication capacity 205, or a combination thereof can be based on or depend on the serving code 120, the interference code 134, or a combination thereof.

The receiver capacity function 302 can be represented as 'y=$f_i$(x)', with 'i=1,2'. The receiver capacity function 302 can be based on an argument 'x' representing the interference communication capacity 205 including rate, or equivalently the MCS, of the interference signal 128. The function value can include throughput performance of the serving signal 116 or the serving communication capacity 203.

The receiver capacity function 302 can be determined by the receiving device. For example, the receiver capacity function 302 can be determined or generated by the first user device 102 of FIG. 1, the second user device 104 of FIG. 1, the first node device 106 of FIG. 1, the second node device 108 of FIG. 1, or a combination thereof. As a more specific example, the receiver capacity function 302 can be determined or generated by the first user device 102 receiving the receiver signal 126 of FIG. 2.

The receiver capacity function 302 can include a set pattern similar to the communication rate profile 202. For example, the receiver capacity function 302 can include a flat segment or a segment including low magnitude for slope for the left-most segment where the interference communication capacity 205 is low. Also for example, the receiver capacity function 302 can include a segment having negative slope following the first flat segment. Also for example, the receiver capacity function 302 can include a second flat segment with lower values of the serving communication capacity 203 than the first flat segment.

The receiving device can determine or generate the receiver capacity function 302 to describe or represent the capability or the capacity of the interference-aware receiver 146 in various interference environments. The receiving device can determine or generate the receiver capacity function 302 as a function of the interference environment, as represented by the interference signal 128, the interference communication capacity 205, the interference modulation 136, or a combination thereof.

The receiver capacity function 302 can include a modulation rate set 304. The modulation rate set 304 is a set of coordinates or corresponding values describing or representing key locations for the receiver capacity function 302. The modulation rate set 304 can include coordinates or corresponding values between the serving communication capacity 203 and the interference communication capacity 205, between the serving communication capacity 203 and the interference modulation 136, or between the serving communication capacity 203 and the interference code 134.

The modulation rate set 304 can represent a grouping of possible coordinates or values for the receiver capacity function 302. For example, the modulation rate set 304 can represent the grouping possible coordinates or values according to the modulation set 124. Also for example, the modulation rate set 304 can represent a grouping of coordinates or values for serving as the basis of recreating the receiver capacity function 302, the communication rate profile 202, or a combination thereof.

As a more specific example, the modulation rate set 304 can include an end point or a mid-point for the interference-free rate 208 of FIG. 2 or the first left-most segment of the receiver capacity function 302, the partial-recognition rate 210 of FIG. 2 or a sloped or middle segment, the last right-most segment, or a combination thereof. Also as a more specific example, the modulation rate set 304 can include a point representing the transition between the segments or portions.

The computing system 100 can use one coordinate or value pairing or a subset of the modulation rate set 304 for representing or communicating the receiver capacity function 302. The computing system 100 can use a designated interference rate 306 and a corresponding serving rate 308, a dynamic coordinate or value pairing, or a combination thereof.

The designated interference rate 306 is a predetermined value of the interference communication capacity 205 for representing the receiver capacity function 302. The designated interference rate 306 can include a set communication rate for the interference signal for representing capability or capacity of the interference-aware receiver 146. The designated interference rate 306 can further include a known interference communication rate for reporting the serving-interference metric 150 of FIG. 1. The designated interference rate 306 can be predetermined by the computing system 100, communication standard, or a combination thereof.

The corresponding serving rate 308 is the serving communication capacity 203 associated with the designated interference rate 306. The corresponding serving rate 308 can include the communication rate resulting for the serving signal 116 using the interference-aware receiver 146 for the interference environment represented by the designated interference rate 306.

The corresponding serving rate 308 can describe the particular instance of the interference-aware receiver 146 at the designated interference rate 306 for reporting the serving-interference metric 150. The receiving device can report back the corresponding serving rate 308. The computing system 100 can use the pairing between the corresponding serving rate 308 and the known instance of the designated interference rate 306 to generate or determine the receiver capacity function 302, the communication rate profile 202, or a combination thereof.

The dynamic coordinate is a set of values or a coordinate determined or generated by the receiving device. The dynamic coordinate can include a dynamic interference point 310 and a dynamic serving point 312.

The dynamic interference point 310 is a specific value or instance of the interference communication capacity 205 chosen by the receiving device for representing the receiver capacity function 302, the communication rate profile 202, or a combination thereof. The dynamic serving point 312 is a specific value or instance of the serving communication capacity 203 corresponding to the dynamic interference point 310 chosen by the receiving device for representing the receiver capacity function 302, the communication rate profile 202, or a combination thereof. The receiving device can communicate both the dynamic serving point 312 and the dynamic interference point 310 for the serving-interference metric 150.

The computing system 100 can further include a modulation function 314 for representing the interference-aware receiver 146. The modulation function 314 can include a capacity or a capability of the interference-aware receiver 146 according to the interference modulation 136. The modulation function 314 can include a flat region or a rate within a small range for each instance of the interference modulation 136. The modulation function 314 can be similar to the communication rate profile 202, the receiver capacity function 302, or a combination thereof.

The computing system 100 can use a method or a mechanism for determining, generating, updating, or a combination thereof for the modulation function 314, the communication rate profile 202, the receiver capacity function 302, the serving-interference metric 150, or a combination thereof. For example, the receiving device can determine or generate the receiver capacity function 302 and the serving-interference metric 150.

Also for example, the base station can determine, generate, update, or a combination thereof for the modulation function 314, the communication rate profile 202, or a combination thereof using the serving-interference metric 150. Details regarding the method, the mechanism, the modulation function 314, the communication rate profile 202, the receiver capacity function 302, the serving-interference metric 150, or a combination thereof are described below.

Figure 4:
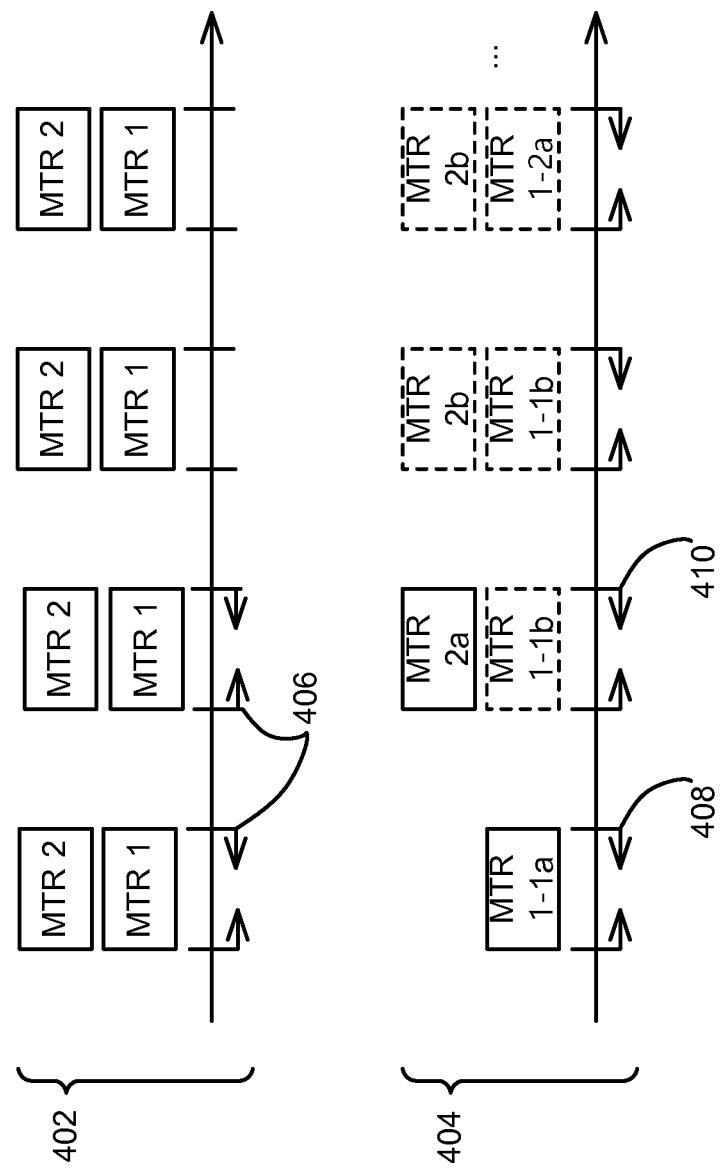
FIG. 4 is an exemplary illustration of a one-shot mechanism and an incremental mechanism for the computing system.

Referring now to FIG. 4, therein is shown an exemplary illustration of a one-shot mechanism 402 and an incremental mechanism 404 for the computing system 100 of FIG. 1. The one-shot mechanism 402 is a method or a process for communicating the serving-interference metric 150 of FIG. 1 over one instance of feedback slot 406. For example, the computing system 100 can communicate the corresponding serving rate 308 of FIG. 3, the dynamic interference point 310 of FIG. 3 and the dynamic serving point 312 of FIG. 3, or a combination thereof using a single instance of the feedback slot 406 according to the one-shot mechanism 402.

The incremental mechanism 404 is a method or a process for communicating the serving-interference metric 150 over multiple instances of the feedback slot 406. For example the computing system 100 can communicate the corresponding serving rate 308, the dynamic interference point 310, the dynamic serving point 312, a portion therein, or a combination thereof using multiple instances of the feedback slot 406 according to the incremental mechanism 404.

As a more specific example, the first user device 102 of FIG. 1 can transmit a portion of the serving-interference metric 150 including the corresponding serving rate 308, the dynamic interference point 310, the dynamic serving point 312, a portion therein, or a combination thereof through first slot 408. The second user device 104 of FIG. 1 can similarly transmit the serving-interference metric 150 corresponding thereto through second slot 410. The first user device 102 can also transmit a different portion of the serving-interference metric 150 through the second slot 410.

The computing system 100 can alternate between the first user device 102 and the second user device 104 each transmitting the serving-interference metric 150 for sequential instances of the feedback slot 406, such as for the first slot 408 and the second slot 410. The computing system 100 can further transmit different portions of the serving-interference metric 150 in each instance of the feedback slot 406, such as for the first slot 408 and the second slot 410.

The feedback slot 406 can include a resource unit designated for providing the feedback signal 148 of FIG. 1 or the serving-interference metric 150. The feedback slot 406 can include a time period, a frequency, a code, or a combination thereof designated for communicating the feedback signal 148 or the serving-interference metric 150. The feedback slot 406 can include a unit occurring in a repeated pattern or a sequence of slots. For example, the feedback slot 406 can include the first slot 408 and the second slot 410 occurring subsequent or adjacent to the first slot 408.

Figure 5:
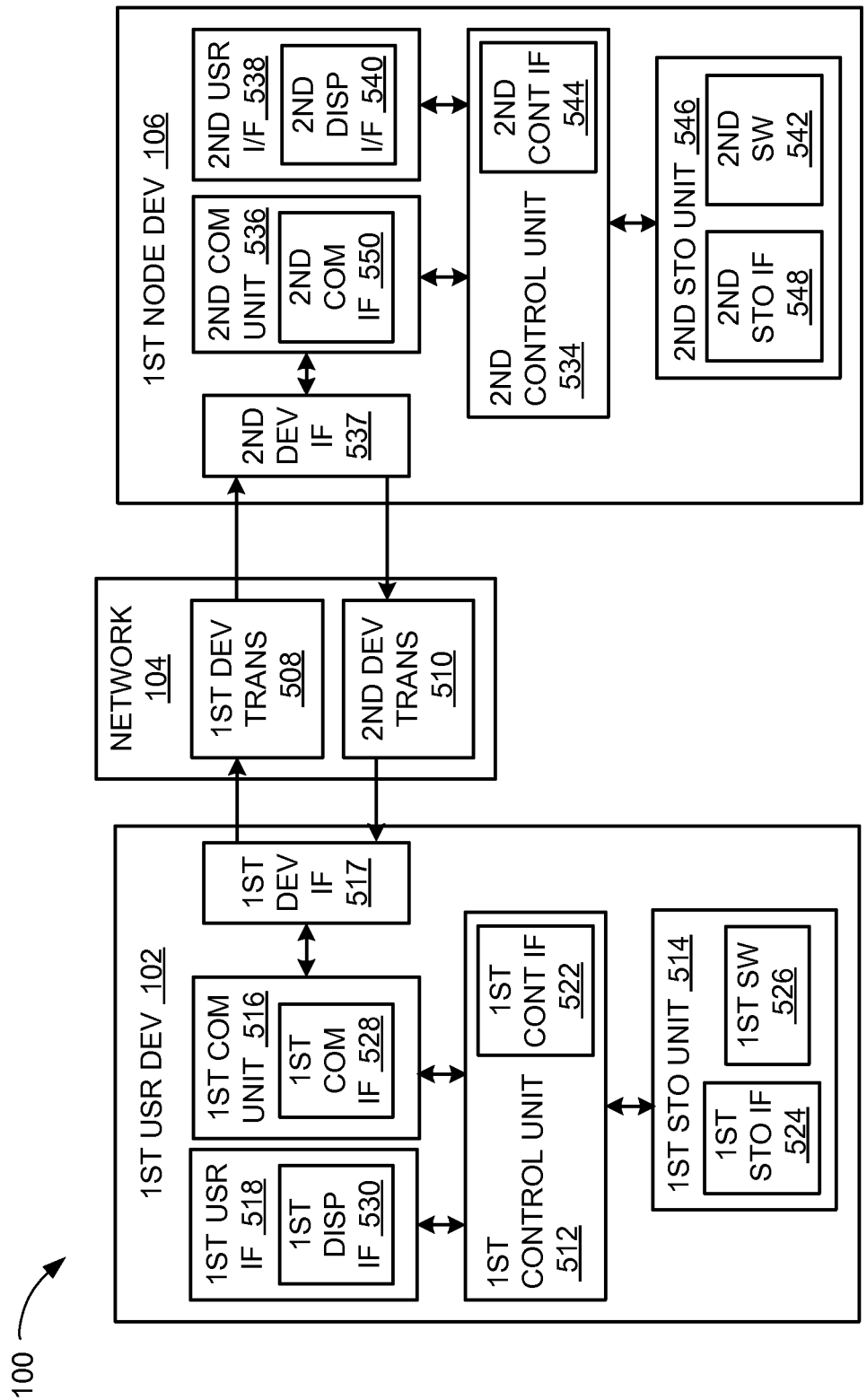
FIG. 5 is an exemplary block diagram of the computing system.

Referring now to FIG. 5, therein is shown an exemplary block diagram of the computing system 100. The computing system 100 can include the first user device 102, the network 110, and the first node device 106. The first user device 102 can send information in a first device transmission 508 over the network 110 to the first node device 106. The first node device 106 can send information in a second device transmission 510 over the network 110 to the first user device 102.

For illustrative purposes, the computing system 100 is shown with the first user device 102 as a client device, although it is understood that the computing system 100 can have the first user device 102 as a different type of device. For example, the first user device 102 can be a server having a display interface.

Also for illustrative purposes, the computing system 100 is shown with the first node device 106 as a server, although it is understood that the computing system 100 can have the first node device 106 as a different type of device. For example, the first node device 106 can be a client device.

For brevity of description in this embodiment of the present invention, the first user device 102 will be described as a client device and the first node device 106 will be described as a server device. The embodiment of the present invention is not limited to this selection for the type of devices. The selection is an example of an embodiment of the present invention.

The first user device 102 can include a first control unit 512, a first storage unit 514, a first communication unit 516, and a first user interface 518. The first control unit 512 can include a first control interface 522. The first control unit 512 can execute a first software 526 to provide the intelligence of the computing system 100.

The first control unit 512 can be implemented in a number of different manners. For example, the first control unit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control unit 512 and other functional units in the first user device 102. The first control interface 522 can also be used for communication that is external to the first user device 102.

The first control interface 522 can receive information from the other functional units or from external sources, or can transmit information to the other functional units or to external destinations. The external sources and the external destinations refer to sources and destinations external to the first user device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first storage unit 514 can store the first software 526. The first storage unit 514 can also store the relevant information, such as data representing incoming images, data representing previously presented image, sound files, or a combination thereof.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between the first storage unit 514 and other functional units in the first user device 102. The first storage interface 524 can also be used for communication that is external to the first user device 102.

The first storage interface 524 can receive information from the other functional units or from external sources, or can transmit information to the other functional units or to external destinations. The external sources and the external destinations refer to sources and destinations external to the first user device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first user device 102. For example, the first communication unit 516 can permit the first user device 102 to communicate with the first node device 106, a different device, an attachment, such as a peripheral device or a desktop computer, the network 110, or a combination thereof.

The first communication unit 516 can also function as a communication hub allowing the first user device 102 to function as part of the network 110 and not limited to be an end point or terminal unit to the network 110. The first communication unit 516 can include active and passive components, such as microelectronics or an antenna, for interaction with the network 110.

The first communication unit 516 can include a baseband device or component, a modem, a digital signal processor, or a combination thereof for transmitting, formatting, receiving, detecting, decoding, further processing, or a combination thereof for communication signals. The first communication unit 516 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 516 can further include one or more portions for storing information, such as cache or RAM memory, registers, or a combination thereof.

The first communication unit 516 can be coupled with a first inter-device interface 517. The first inter-device interface 517 can be a device or a portion of a device for physically communicating signals with a separate device. The first inter-device interface 517 can communicate by transmitting or receiving signals to or from another device. The first inter-device interface 517 can include one or more antennas for wireless signals, a physical connection and receiver-transmitter for wired signals, or a combination thereof. The first inter-device interface 517 can include an omnidirectional antenna, a wire, an antenna chip, a ceramic antenna, or a combination thereof. The first inter-device interface 517 can further include a port, a wire, a repeater, a connector, a filter, a sensor, or a combination thereof.

The first inter-device interface 517 can detect or respond to a power in electromagnetic waves and provide the detected result to the first communication unit 516 to receive a signal, including the second device transmission 510. The first inter-device interface 517 can provide a path or respond to currents or voltages provided by the first communication unit 516 to transmit a signal, including the first device transmission 508.

The first communication unit 516 can include a first communication interface 528. The first communication interface 528 can be used for communication between the first communication unit 516 and other functional units in the first user device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first user device 102. The first user interface 518 can include an input device and an output device. Examples of the input device of the first user interface 518 can include a keypad, a touchpad, soft-keys, a keyboard, a microphone, an infrared sensor for receiving remote signals, or any combination thereof to provide data and communication inputs.

The first user interface 518 can include a first display interface 530. The first display interface 530 can include an output device. The first display interface 530 can include a display, a projector, a video screen, a speaker, or any combination thereof.

The first control unit 512 can operate the first user interface 518 to display information generated by the computing system 100. The first control unit 512 can also execute the first software 526 for the other functions of the computing system 100. The first control unit 512 can further execute the first software 526 for interaction with the network 110 via the first communication unit 516.

The first node device 106 can be optimized for implementing an embodiment of the present invention in a multiple device embodiment with the first user device 102. The first node device 106 can provide the additional or higher performance processing power compared to the first user device 102. The first node device 106 can include a second control unit 534, a second communication unit 536, a second user interface 538, and a second storage unit 546.

The second user interface 538 allows a user (not shown) to interface and interact with the first node device 106. The second user interface 538 can include an input device and an output device. Examples of the input device of the second user interface 538 can include a keypad, a touchpad, softkeys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the first node device 106 of the computing system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the computing system 100, including operating the second communication unit 536 to communicate with the first user device 102 over the network 110.

The second control unit 534 can be implemented in a number of different manners. For example, the second control unit 534 can be a processor, an embedded processor, a microprocessor, hardware control logic, a hardware finite state machine (FSM), a digital signal processor (DSP), or a combination thereof.

The second control unit 534 can include a second control interface 544. The second control interface 544 can be used for communication between the second control unit 534 and other functional units in the first node device 106. The second control interface 544 can also be used for communication that is external to the first node device 106.

The second control interface 544 can receive information from the other functional units or from external sources, or can transmit information to the other functional units or to external destinations. The external sources and the external destinations refer to sources and destinations external to the first node device 106.

The second control interface 544 can be implemented in different ways and can include different implementations depending on which functional units or external units are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the information such as data representing incoming images, data representing previously presented image, sound files, or a combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the computing system 100 is shown with the second storage unit 546 as a single hierarchy storage system, although it is understood that the computing system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between the second storage unit 546 and other functional units in the first node device 106. The second storage interface 548 can also be used for communication that is external to the first node device 106.

The second storage interface 548 can receive information from the other functional units or from external sources, or can transmit information to the other functional units or to external destinations. The external sources and the external destinations refer to sources and destinations external to the first node device 106.

The second storage interface 548 can include different implementations depending on which functional units or external units are being interfaced with the second storage unit 546. The second storage interface 548 can be implemented with technologies and techniques similar to the implementation of the second control interface 544.

The second communication unit 536 can enable external communication to and from the first node device 106. For example, the second communication unit 536 can permit the first node device 106 to communicate with the first user device 102 over the network 110.

The second communication unit 536 can also function as a communication hub allowing the first node device 106 to function as part of the network 110 and not limited to be an end point or terminal unit to the network 110. The second communication unit 536 can include active and passive components, such as microelectronics or resistors, for interaction with the network 110.

The second communication unit 536 can include a baseband device or component, a modem, a digital signal processor, or a combination thereof for transmitting, formatting, receiving, detecting, decoding, further processing, or a combination thereof for communication signals. The second communication unit 536 can include one or more portions for processing the voltages, the currents, the digital information, or a combination thereof, such as an analog-to-digital converter, a digital-to-analog converter, a filter, an amplifier, a processor-type circuitry, or a combination thereof. The second communication unit 536 can further include one or more portions for storing information, such as cache or RAM memory, registers, or a combination thereof.

The second communication unit 536 can be coupled with a second inter-device interface 537. The second inter-device interface 537 can be a device or a portion of a device for physically communicating signals with a separate device. The second inter-device interface 537 can communicate by transmitting or receiving signals to or from another device. The second inter-device interface 537 can include one or more antennas for wireless signals, a physical connection and receiver-transmitter for wired signals, or a combination thereof. The second inter-device interface 537 can include an omnidirectional antenna, a wire, an antenna chip, a ceramic antenna, or a combination thereof. The second inter-device interface 537 can further include a port, a wire, a repeater, a connector, a filter, a sensor, or a combination thereof.

The second inter-device interface 537 can detect or respond to a power in electromagnetic waves and provide the detected result to the second communication unit 536 to receive a signal, including the first device transmission 508. The second inter-device interface 537 can provide a path or respond to currents or voltages provided by the second communication unit 536 to transmit a signal, including the second device transmission 510.

The second communication unit 536 can include a second communication interface 550. The second communication interface 550 can be used for communication between the second communication unit 536 and other functional units in the first node device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second control interface 544.

The first communication unit 516 can couple with the network 110 to send information to the first node device 106 in the first device transmission 508. The first node device 106 can receive information in the second communication unit 536 from the first device transmission 508 of the network 110.

The second communication unit 536 can couple with the network 110 to send information to the first user device 102 in the second device transmission 510. The first user device 102 can receive information in the first communication unit 516 from the second device transmission 510 of the network 110. The computing system 100 can be executed by the first control unit 512, the second control unit 534, or a combination thereof. For illustrative purposes, the first node device 106 is shown with the partition having the second user interface 538, the second storage unit 546, the second control unit 534, and the second communication unit 536, although it is understood that the first node device 106 can have a different partition. For example, the second software 542 can be partitioned differently such that some or all of its function can be in the second control unit 534 and the second communication unit 536. Also, the first node device 106 can include other functional units not shown in FIG. 5 for clarity.

The functional units in the first user device 102 can work individually and independently of the other functional units. The first user device 102 can work individually and independently from the first node device 106 and the network 110.

The functional units in the first node device 106 can work individually and independently of the other functional units. The first node device 106 can work individually and independently from the first user device 102 and the network 110.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first user device 102 and the first node device 106. It is understood that the first user device 102 and the first node device 106 can operate any of the blocks and functions of the computing system 100.

Figure 6:
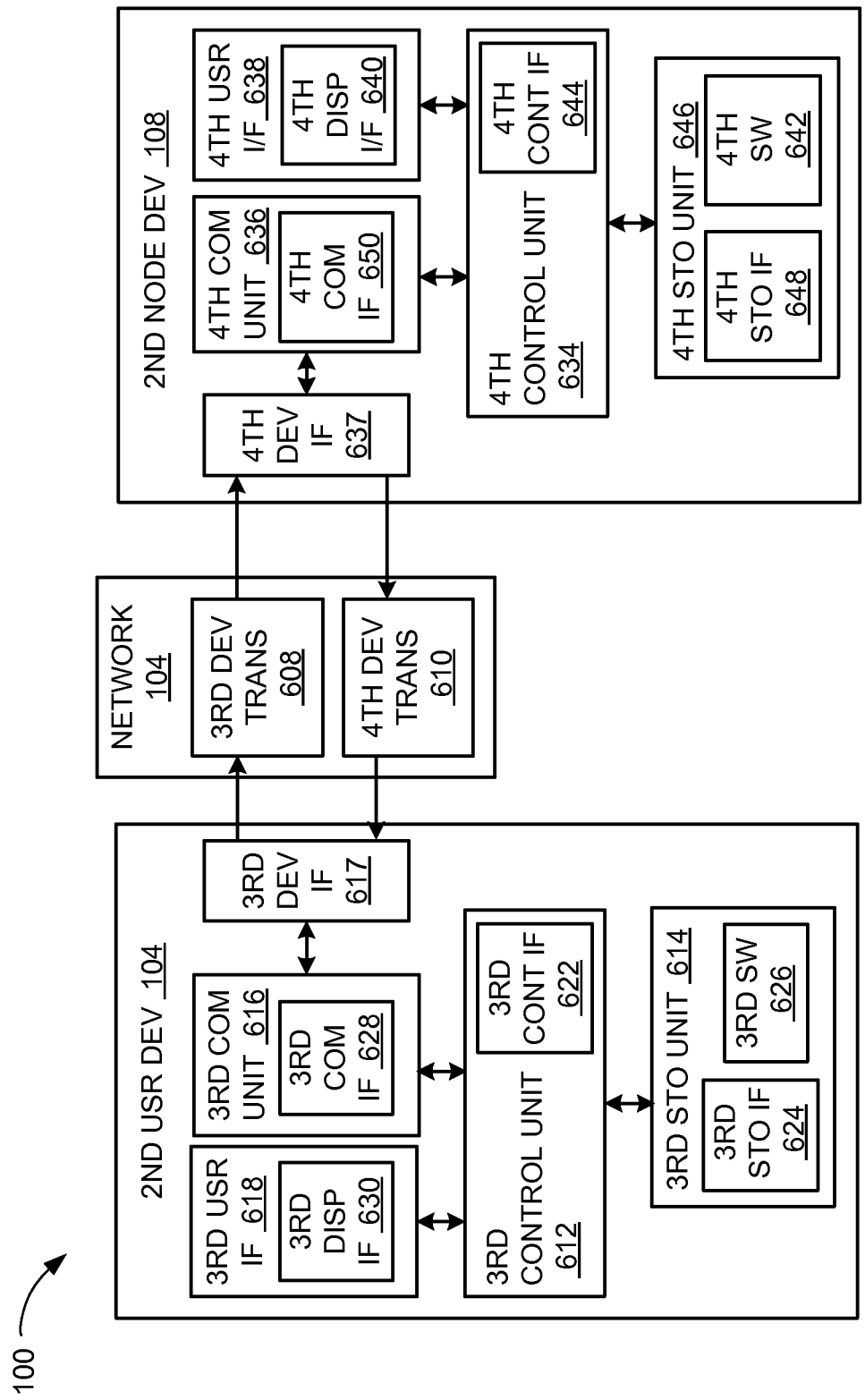
FIG. 6 is a further exemplary block diagram of the computing system.

Referring now to FIG. 6, therein is shown a further exemplary block diagram of the computing system 100. The computing system 100 can include the second user device 104, the network 110, and the second node device 108. The second user device 104 can send information in a third device transmission 608 over the network 110 to the second node device 108. The second node device 108 can send information in a fourth device transmission 610 over the network 110 to the second user device 104.

For illustrative purposes, the computing system 100 is shown with the second user device 104 as a client device, although it is understood that the computing system 100 can have the second user device 104 as a different type of device. For example, the second user device 104 can be a server having a display interface.

Also for illustrative purposes, the computing system 100 is shown with the second node device 108 as a server, although it is understood that the computing system 100 can have the second node device 108 as a different type of device. For example, the second node device 108 can be a client device.

For brevity of description in this embodiment of the present invention, the second user device 104 will be described as a client device and the second node device 108 will be described as a server device. The embodiment of the present invention is not limited to this selection for the type of devices. The selection is an example of an embodiment of the present invention.

The second user device 104 can include a third control unit 612, a third storage unit 614, a third communication unit 616, and a third user interface 618. The third control unit 612 can include a third control interface 622. The third control unit 612 can execute a third software 626 to provide the intelligence of the computing system 100.

The third control unit 612 can be implemented in a number of different manners. For example, the third control unit 612 can be a processor, an ASIC, an embedded processor, a microprocessor, a hardware control logic, a hardware FSM, a DSP, or a combination thereof. The third control interface 622 can be used for communication between the third control unit 612 and other functional units in the second user device 104. The third control interface 622 can also be used for communication that is external to the second user device 104.

The third control interface 622 can receive information from the other functional units or from external sources, or can transmit information to the other functional units or to external destinations. The external sources and the external destinations refer to sources and destinations external to the second user device 104.

The third control interface 622 can be implemented in different ways and can include different implementations depending on which functional units or external units are being interfaced with the third control interface 622. For example, the third control interface 622 can be implemented with a pressure sensor, an inertial sensor, a microelectromechanical system (MEMS), optical circuitry, waveguides, wireless circuitry, wireline circuitry, or a combination thereof.

The third storage unit 614 can store the third software 626. The third storage unit 614 can also store the relevant information, such as data representing incoming images, data representing previously presented image, sound files, or a combination thereof.

The third storage unit 614 can be a volatile memory, a nonvolatile memory, an internal memory, an external memory, or a combination thereof. For example, the third storage unit 614 can be a nonvolatile storage such as NVRAM, Flash memory, disk storage, or a volatile storage such as SRAM.

The third storage unit 614 can include a third storage interface 624. The third storage interface 624 can be used for communication between the third storage unit 614 and other functional units in the second user device 104. The third storage interface 624 can also be used for communication that is external to the second user device 104.

The third storage interface 624 can receive information from the other functional units or from external sources, or can transmit information to the other functional units or to external destinations. The external sources and the external destinations refer to sources and destinations external to the second user device 104.

The third storage interface 624 can include different implementations depending on which functional units or external units are being interfaced with the third storage unit 614. The third storage interface 624 can be implemented with technologies and techniques similar to the implementation of the third control interface 622.

The third communication unit 616 can enable external communication to and from the second user device 104. For example, the third communication unit 616 can permit the second user device 104 to communicate with the second node device 108, a different device, an attachment, such as a peripheral device or a desktop computer, the network 110, or a combination thereof.

The third communication unit 616 can also function as a communication hub allowing the second user device 104 to function as part of the network 110 and not limited to be an end point or terminal unit to the network 110. The third communication unit 616 can include active and passive components, such as microelectronics or an antenna, for interaction with the network 110.

The third communication unit 616 can include a baseband device or component, a modem, a digital signal processor, or a combination thereof for transmitting, formatting, receiving, detecting, decoding, further processing, or a combination thereof for communication signals. The third communication unit 616 can include one or more portions for processing the voltages, the currents, the digital information, or a combination thereof, such as an analog-to-digital converter, a digital-to-analog converter, a filter, an amplifier, a processor-type circuitry, or a combination thereof. The third communication unit 616 can further include one or more portions for storing information, such as cache or RAM memory, registers, or a combination thereof.

The third communication unit 616 can be coupled with a third inter-device interface 617. The third inter-device interface 617 can be a device or a portion of a device for physically communicating signals with a separate device. The third inter-device interface 617 can communicate by transmitting or receiving signals to or from another device. The third inter-device interface 617 can include one or more antennas for wireless signals, a physical connection and receiver-transmitter for wired signals, or a combination thereof. The third inter-device interface 617 can include an omnidirectional antenna, a wire, an antenna chip, a ceramic antenna, or a combination thereof. The third inter-device interface 617 can further include a port, a wire, a repeater, a connector, a filter, a sensor, or a combination thereof.

The third inter-device interface 617 can detect or respond to a power in electromagnetic waves and provide the detected result to the third communication unit 616 to receive a signal, including the fourth device transmission 610. The third inter-device interface 617 can provide a path or respond to currents or voltages provided by the third communication unit 616 to transmit a signal, including the third device transmission 608.

The third communication unit 616 can include a third communication interface 628. The third communication interface 628 can be used for communication between the third communication unit 616 and other functional units in the second user device 104. The third communication interface 628 can receive information from the other functional units or can transmit information to the other functional units.

The third communication interface 628 can include different implementations depending on which functional units are being interfaced with the third communication unit 616. The third communication interface 628 can be implemented with technologies and techniques similar to the implementation of the third control interface 622.

The third user interface 618 allows a user (not shown) to interface and interact with the second user device 104. The third user interface 618 can include an input device and an output device. Examples of the input device of the third user interface 618 can include a keypad, a touchpad, soft-keys, a keyboard, a microphone, an infrared sensor for receiving remote signals, or any combination thereof to provide data and communication inputs.

The third user interface 618 can include a third display interface 630. The third display interface 630 can include an output device. The third display interface 630 can include a display, a projector, a video screen, a speaker, or any combination thereof.

The third control unit 612 can operate the third user interface 618 to display information generated by the computing system 100. The third control unit 612 can also execute the third software 626 for the other functions of the computing system 100. The third control unit 612 can further execute the third software 626 for interaction with the network 110 via the third communication unit 616.

The second node device 108 can be optimized for implementing an embodiment of the present invention in a multiple device embodiment with the second user device 104. The second node device 108 can provide the additional or higher performance processing power compared to the second user device 104. The second node device 108 can include a fourth control unit 634, a fourth communication unit 636, a fourth user interface 638, and a fourth storage unit 646.

The fourth user interface 638 allows a user (not shown) to interface and interact with the second node device 108. The fourth user interface 638 can include an input device and an output device. Examples of the input device of the fourth user interface 638 can include a keypad, a touchpad, soft-keys, a keyboard, a microphone, or any combination thereof to provide data and communication inputs. Examples of the output device of the fourth user interface 638 can include a fourth display interface 640. The fourth display interface 640 can include a display, a projector, a video screen, a speaker, or any combination thereof.

The fourth control unit 634 can execute a fourth software 642 to provide the intelligence of the second node device 108 of the computing system 100. The fourth software 642 can operate in conjunction with the third software 626. The fourth control unit 634 can provide additional performance compared to the third control unit 612.

The fourth control unit 634 can operate the fourth user interface 638 to display information. The fourth control unit 634 can also execute the fourth software 642 for the other functions of the computing system 100, including operating the fourth communication unit 636 to communicate with the second user device 104 over the network 110.

The fourth control unit 634 can be implemented in a number of different manners. For example, the fourth control unit 634 can be a processor, an embedded processor, a microprocessor, hardware control logic, a hardware FSM, a DSP, or a combination thereof.

The fourth control unit 634 can include a fourth control interface 644. The fourth control interface 644 can be used for communication between the fourth control unit 634 and other functional units in the second node device 108. The fourth control interface 644 can also be used for communication that is external to the second node device 108.

The fourth control interface 644 can receive information from the other functional units or from external sources, or can transmit information to the other functional units or to external destinations. The external sources and the external destinations refer to sources and destinations external to the second node device 108.

The fourth control interface 644 can be implemented in different ways and can include different implementations depending on which functional units or external units are being interfaced with the fourth control interface 644. For example, the fourth control interface 644 can be implemented with a pressure sensor, an inertial sensor, a microelectromechanical system (MEMS), optical circuitry, waveguides, wireless circuitry, wireline circuitry, or a combination thereof.

A fourth storage unit 646 can store the fourth software 642. The fourth storage unit 646 can also store the information such as data representing incoming images, data representing previously presented image, sound files, or a combination thereof. The fourth storage unit 646 can be sized to provide the additional storage capacity to supplement the third storage unit 614.

For illustrative purposes, the fourth storage unit 646 is shown as a single element, although it is understood that the fourth storage unit 646 can be a distribution of storage elements. Also for illustrative purposes, the computing system 100 is shown with the fourth storage unit 646 as a single hierarchy storage system, although it is understood that the computing system 100 can have the fourth storage unit 646 in a different configuration. For example, the fourth storage unit 646 can be formed with different storage technologies forming a memory hierarchal system including different levels of caching, main memory, rotating media, or off-line storage.

The fourth storage unit 646 can be a volatile memory, a nonvolatile memory, an internal memory, an external memory, or a combination thereof. For example, the fourth storage unit 646 can be a nonvolatile storage such as NVRAM, Flash memory, disk storage, or a volatile storage such as SRAM.

The fourth storage unit 646 can include a fourth storage interface 648. The fourth storage interface 648 can be used for communication between the fourth storage unit 646 and other functional units in the second node device 108. The fourth storage interface 648 can also be used for communication that is external to the second node device 108.

The fourth storage interface 648 can receive information from the other functional units or from external sources, or can transmit information to the other functional units or to external destinations. The external sources and the external destinations refer to sources and destinations external to the second node device 108.

The fourth storage interface 648 can include different implementations depending on which functional units or external units are being interfaced with the fourth storage unit 646. The fourth storage interface 648 can be implemented with technologies and techniques similar to the implementation of the fourth control interface 644.

The fourth communication unit 636 can enable external communication to and from the second node device 108. For example, the fourth communication unit 636 can permit the second node device 108 to communicate with the second user device 104 over the network 110.

The fourth communication unit 636 can also function as a communication hub allowing the second node device 108 to function as part of the network 110 and not limited to be an end point or terminal unit to the network 110. The fourth communication unit 636 can include active and passive components, such as microelectronics or resistors, for interaction with the network 110.

The fourth communication unit 636 can include a baseband device or component, a modem, a digital signal processor, or a combination thereof for transmitting, formatting, receiving, detecting, decoding, further processing, or a combination thereof for communication signals. The fourth communication unit 636 can include one or more portions for processing the voltages, the currents, the digital information, or a combination thereof, such as an analog-to-digital converter, a digital-to-analog converter, a filter, an amplifier, a processor-type circuitry, or a combination thereof. The fourth communication unit 636 can further include one or more portions for storing information, such as cache or RAM memory, registers, or a combination thereof.

The fourth communication unit 636 can be coupled with a fourth inter-device interface 637. The fourth inter-device interface 637 can be a device or a portion of a device for physically communicating signals with a separate device. The fourth inter-device interface 637 can communicate by transmitting or receiving signals to or from another device. The fourth inter-device interface 637 can include one or more antennas for wireless signals, a physical connection and receiver-transmitter for wired signals, or a combination thereof. The fourth inter-device interface 637 can include an omnidirectional antenna, a wire, an antenna chip, a ceramic antenna, or a combination thereof. The fourth inter-device interface 637 can further include a port, a wire, a repeater, a connector, a filter, a sensor, or a combination thereof.

The fourth inter-device interface 637 can detect or respond to a power in electromagnetic waves and provide the detected result to the fourth communication unit 636 to receive a signal, including the third device transmission 608. The fourth inter-device interface 637 can provide a path or respond to currents or voltages provided by the fourth communication unit 636 to transmit a signal, including the fourth device transmission 610.

The fourth communication unit 636 can include a fourth communication interface 650. The fourth communication interface 650 can be used for communication between the fourth communication unit 636 and other functional units in the second node device 108. The fourth communication interface 650 can receive information from the other functional units or can transmit information to the other functional units.

The fourth communication interface 650 can include different implementations depending on which functional units are being interfaced with the fourth communication unit 636. The fourth communication interface 650 can be implemented with technologies and techniques similar to the implementation of the fourth control interface 644.

The third communication unit 616 can couple with the network 110 to send information to the second node device 108 in the third device transmission 608. The second node device 108 can receive information in the fourth communication unit 636 from the third device transmission 608 of the network 110.

The fourth communication unit 636 can couple with the network 110 to send information to the second user device 104 in the fourth device transmission 610. The second user device 104 can receive information in the third communication unit 616 from the fourth device transmission 610 of the network 110. The computing system 100 can be executed by the third control unit 612, the fourth control unit 634, or a combination thereof. For illustrative purposes, the second node device 108 is shown with the partition having the fourth user interface 638, the fourth storage unit 646, the fourth control unit 634, and the fourth communication unit 636, although it is understood that the second node device 108 can have a different partition. For example, the fourth software 642 can be partitioned differently such that some or all of its function can be in the fourth control unit 634 and the fourth communication unit 636. Also, the second node device 108 can include other functional units not shown in FIG. 6 for clarity.

The functional units in the second user device 104 can work individually and independently of the other functional units. The second user device 104 can work individually and independently from the second node device 108 and the network 110.

The functional units in the second node device 108 can work individually and independently of the other functional units. The second node device 108 can work individually and independently from the second user device 104 and the network 110.

The functional units described above can be implemented in hardware. For example, one or more of the functional units can be implemented using the a gate, circuitry, a processor, a computer, integrated circuit, integrated circuit cores, a pressure sensor, an inertial sensor, a MEMS, a passive device, a physical non-transitory memory medium having instructions for performing the software function, a portion therein, or a combination thereof.

For illustrative purposes, the computing system 100 is described by operation of the second user device 104 and the second node device 108. It is understood that the second user device 104 and the second node device 108 can operate any of the blocks and functions of the computing system 100.

Figure 7:
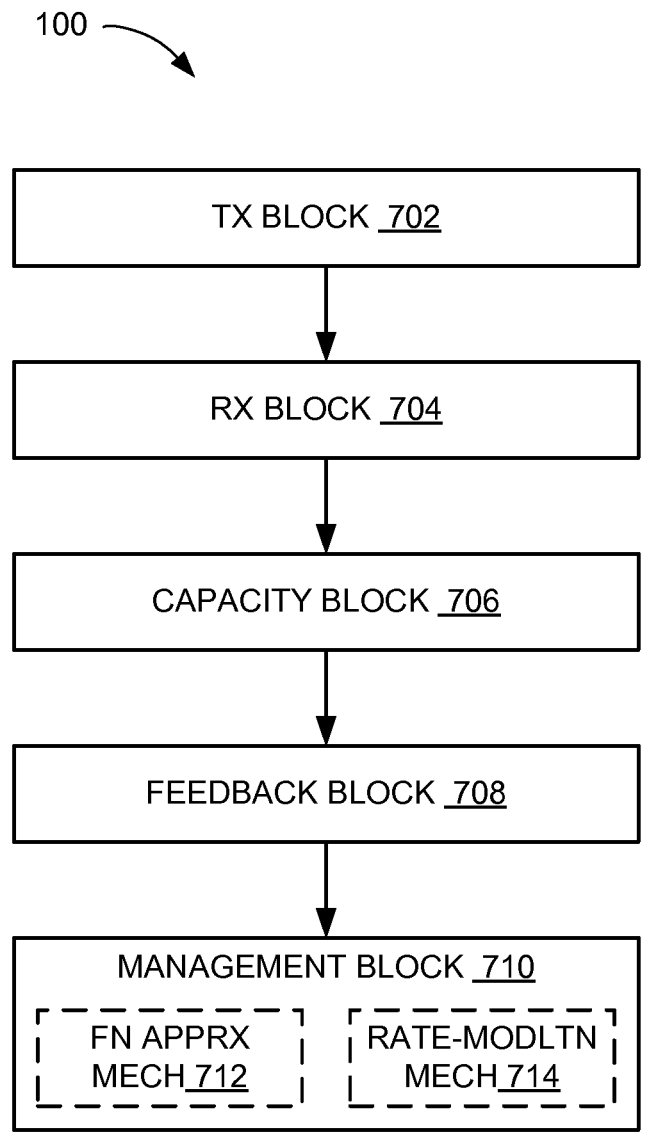
FIG. 7 is a control flow of the computing system.

Referring now to FIG. 7, therein is shown a control flow of the computing system 100. The computing system 100 can include a transmission block 702, a receiver block 704, a capacity block 706, a feedback block 708, a management block 710, or a combination thereof.

The transmission block 702 can be coupled with the receiver block 704, which can be further coupled with the capacity block 706. The capacity block 706 can be coupled with the feedback block 708, which can be further coupled with the management block 710. The management block 710 can be coupled to the transmission block 702.

The blocks can be coupled to each other in a variety of ways. For example, blocks can be coupled by having the input of one blocks connected to the output of another, such as by using wired or wireless connections, the network 110 of FIG. 1, instructional steps, process sequence, or a combination thereof. Also for example, the blocks can be coupled either directly with no intervening structure other than connection means between the directly coupled blocks, or indirectly with blocks or devices other than the connection means between the indirectly coupled blocks.

As a more specific example, one or more inputs or outputs of the transmission block 702 can be connected to one or more inputs or inputs of the receiver block 704 using conductors or the transmission channel without intervening blocks or devices there-between. Also for example, the transmission block 702 can be coupled to the receiver block 704 indirectly using a wireless channel with a repeater, a switch, a routing device, or a combination thereof. The transmission block 702, the receiver block 704, the capacity block 706, the feedback block 708, the management block 710, or a combination thereof can be coupled in similar ways.

The computing system 100 can communicate information between devices, such as by sending, transmitting, receiving, coding, decoding, or a combination thereof. The receiving device can further communicate with the user by displaying images, recreating sounds, exchanging process steps or instructions, or a combination thereof according to the information communicate to the device.

The transmission block 702 is configured to communicate the serving content 112 of FIG. 1. The transmission block 702 can communicate by sending or transmitting the serving signal 116 of FIG. 1 corresponding to the serving content 112.

The transmission block 702 can transmit the serving signal 116 based on processing the serving content 112. The transmission block 702 can transmit the serving signal 116 according to the serving detail 118 of FIG. 1.

For example, the transmission block 702 can generate code words corresponding to the serving content 112 according to a coding mechanism, such as turbo coding mechanism or polar coding mechanism, a coding rate, or a combination thereof according to the serving code 120 of FIG. 1. Also for example, the transmission block 702 can transmit the serving signal 116 according to a modulation scheme or constellation according to the serving modulation 122 of FIG. 1.

The transmission block 702 can transmit the serving signal 112 using the first inter-device interface 517 of FIG. 5, the second inter-device interface 537 of FIG. 5, the third inter-device interface 617 of FIG. 6, the fourth inter-device interface 637 of FIG. 6, the first communication unit 516 of FIG. 5, the second communication unit 536 of FIG. 5, the third communication unit 616 of FIG. 6, the fourth communication unit 636 of FIG. 6, or a combination thereof. The transmission block 702 can process the serving content 112 for transmitting the serving signal 116 using the first communication unit 516, the second communication unit 536, the third communication unit 616, the fourth communication unit 636, the first control unit 512 of FIG. 5, the second control unit 534 of FIG. 5, the third control unit 612 of FIG. 6, the fourth control unit 634 of FIG. 6, or a combination thereof. The transmission block 702 can store the serving signal 112 using the first communication unit 516, the second communication unit 536, the third communication unit 616, the fourth communication unit 636, the first storage unit 514 of FIG. 5, the second storage unit 546 of FIG. 5, the third storage unit 614 of FIG. 6, the fourth storage unit 646 of FIG. 6, or a combination thereof.

After transmitting the serving signal 116, the control flow can pass to the receiver block 704. The control flow can pass through a variety of ways. For example, control flow can pass by having processing results of one block passed to another block, such as by passing the serving signal 116 from the transmission block 702 to the receiver block 704, by storing the processing results at a location known and accessible to the other block, such as by storing the serving signal 116 at a storage location known and accessible to the receiver block 704, by notifying the other block, such as by using a flag, an interrupt, a status signal, or a combination for the receiver block 704, or a combination of processes thereof.

The receiver block 704 is configured to communicate the receiver signal 126 of FIG. 1 corresponding to the serving signal 116. The receiver block 704 can communicate the receiver signal 126 by receiving the receiver signal 126. The receiver block 704 can receive the receiver signal 126 corresponding to or including the serving signal 116 contemporaneous with the interference signal 128 of FIG. 1.

For example, the receiver block 704 can receive the receiver signal 126 at the first user device 102 of FIG. 1, the second user device 104 of FIG. 1, or a combination thereof corresponding to or including one or more signals from the first node device 106 of FIG. 1, the second node device 108 of FIG. 1, or a combination thereof. As a more specific example, the receiver block 704 can receive the receiver signal 126 at the first user device 102 corresponding to or including the serving signal 116 from the first node device 106 and the interference signal 128 from the second node device 108.

The receiver block 704 can receive the receiver signal 126 using the first inter-device interface 517, the second inter-device interface 537, the third inter-device interface 617, the fourth inter-device interface 637, the first communication unit 516, the second communication unit 536, the third communication unit 616, the fourth communication unit 636, or a combination thereof. The receiver block 704 can receive by detecting or identifying electromagnetic energy, voltage, current, power, fluctuations or oscillation, or a combination thereof. The receiver block 704 can store the receiver signal 126 using the first communication unit 516, the second communication unit 536, the third communication unit 616, the fourth communication unit 636, the first storage unit 514, the second storage unit 546, the third storage unit 614, the fourth storage unit 646, or a combination thereof.

The receiver block 704 can further process the receiver signal 126. For example, the receiver block 704 can identify reference portions, identify segments or influences corresponding to the serving signal 116, the interference signal 128, calculate the channel estimate, or a combination thereof.

The receiver block 704 can identify the reference portion for the serving signal 116, the interference signal 128, or a combination thereof in the receiver signal 126. The receiver block 704 can identify the reference portion based on predetermined or known information regarding the reference portion.

For example, the receiver block 704 can identify the reference portion based on frequency, time slot, code, signal shape, phase, magnitude, or a combination thereof designated for the reference portion. The receiver block 704 can identify the reference portion based on the information known or predetermined according to the computing system 100, communication standard, or a combination thereof.

The receiver block 704 can use the reference portion to calculate the channel estimate. For example, the receiver block 704 can use the reference portion or a pilot tone having a frequency, a phase, an amplitude profile, a shape, a power level, or a combination thereof predetermined by the computing system 100, the communication standard, or a combination thereof. The serving signal 116, the interference signal 128, or a combination thereof can be transmitted with the reference portion or the pilot tone according to the predetermination.

Continuing with the example, the receiver signal 126 can have the reference portion or the pilot tone in a corresponding location of the receiver signal 126, but including effects from traversing the communication channel. The receiver block 704 can calculate the channel estimate based on a difference between the predetermined or known instance of the reference portion or the pilot tone and the portion in the receiver signal 126 corresponding to the reference portion or the pilot tone.

As a more specific example, the receiver block 704 can include a model or a vector for changes in amplitude, power, shape, frequency, phase, or a combination thereof. Also as an example, the receiver block 704 can include delays, delay levels corresponding to phases, or a combination thereof.

Also as an example, the receiver block 704 can calculate the serving channel estimate 140 of FIG. 1 according to the difference or changes in the reference portion observed in the receiver signal 126 corresponding to the serving signal 116. Also as an example, the receiver block 704 can calculate the interference channel estimate 142 of FIG. 1 according to the difference or changes in the reference portion observed in the receiver signal 126 corresponding to the interference signal 128.

The receiver block 704 can calculate the channel estimate using the first communication unit 516, the second communication unit 536, the third communication unit 616, the fourth communication unit 636, the first control unit 512, the second control unit 534, the third control unit 612, the fourth control unit 634, or a combination thereof. The receiver block 704 can store the channel estimate in the first communication unit 516, the second communication unit 536, the third communication unit 616, the fourth communication unit 636, the first storage unit 514, the second storage unit 546, the third storage unit 614, the fourth storage unit 646, or a combination thereof.

The receiver block 704 can further process for the serving content 112, the interference content 130, or a combination thereof with the receiver signal 126. The receiver block 704 can utilize the interference-aware receiver 146 to process for the serving content 112, the interference content 130, or a combination thereof.

The receiver block 704 can determine the interference detail 132, including the interference modulation 136. For example, the receiver block 704 can determine the interference detail 132 using blind estimation for the interference detail 132. Also for example, the receiver block 704 can determine the interference detail 132 based on communicating with the serving transmitter.

As a more specific example, the receiver block 704 can include the first user device 102 communicating with the first node device 106 to determine the interference detail 132. The first node device 106 can communicate with the second node device 108 using the node link 114 of FIG. 1 to determine the appropriate instance of the serving detail 118 perceived at the first user device 102 as the interference signal 128. The first node device 106 can send the interference detail 132 to the first user device 102.

The receiver block 704 can detect, decode, or a combination thereof to process for the serving content 112, the interference content 130, or a combination thereof with the receiver signal 126. For example, the receiver block 704 can perform joint detection based on the combined model utilizing the interference modulation 136. The combined model can be represented as:

$$y_i = [H_{i,i} H_{i,j}][x_i, x_j]^T + z_i.$$
Equation (2).

The receiver signal 126 can be represented as '$y_i$', the serving signal 116 can be represented as '$x_i$', and the interference signal 128 can be represented as '$x_j$'. The noise parameter can be represented as '$z_i$', the serving channel estimate 140 can be represented as '$H_{i,i}$', and the interference channel estimate 142 can be represented as '$H_{i,j}$'.

Continuing with the example, the receiver block 704 can implement the joint detection based on minimizing Euclidian distance according to:

$$(\hat{x}_i, \hat{x}_j) = \arg\min_{x_i, x_j} \|y_i - [H_{i,i} H_{i,j}][x_i, x_j]^T\|.$$
Equation (3).

The receiver block 704 can further implement the detection based on:

$$x_i = \arg\min_{x_i} \sum_{x_j} \exp\left(-\frac{\|y_i - [H_{i,i}\ H_{i,j}][x_i, x_j]^T\|^2}{\sigma^2}\right).$$
Equation (4)

The noise measure 144 of FIG. 1 can be represented as '$\sigma^2$'.

The receiver block 704 can similarly utilize decoding process to recognize the serving content 112, the interference content 130, or a combination thereof. The receiver block 704 can utilize the interference-aware receiver 146 and process or recognize the interference content 130 or the interference signal 128 from the receiver signal 126, and further utilize the interference content 130 in processing or recognizing the serving content 112.

After receiving and processing the receiver signal 126, the control flow can be passed from the receiver block 704 to the capacity block 706. The control flow can pass similarly as described above between the receiver block 704 and the capacity block 706 but using processing results of the receiver block 704, such as the receiver signal 126.

The capacity block 706 is configured to determine information appropriate for describing the receiving device. The capacity block 706 can determine the receiver capacity function 302 of FIG. 3 for describing the first user device 102, the second user device 104, the first node device 106, the second node device 108, or a combination thereof receiving the receiver signal 126.

The capacity block 706 can determine the receiver capacity function 302 describing capability of the interference-aware receiver 146 of FIG. 1 associated with the serving communication capacity 203 of FIG. 1, the interference communication capacity 205 of FIG. 1, or a combination thereof. For example, the capacity block 706 can determine the receiver capacity function 302 for the first user device 102 including the interference-aware receiver 146 processing the serving content 112 from the receiver signal 126 including the interference signal 128.

As a more specific example, the capacity block 706 can determine the receiver capacity function 302 describing or representing the serving communication capacity 203 achievable or resulting with the interference-aware receiver. The receiver capacity function 302 can describe the communication rate of the serving signal 116 achievable or resulting for various values or instances of the interference communication capacity 205, including communication rate of the interference signal 128.

The capacity block 706 can determine the receiver capacity function 302 in a variety of ways. For example, the capacity block 706 can determine the receiver capacity function 302 based on generating the receiver capacity function 302. The capacity block 706 can store information regarding the interference signal 128, such as the communication rate or the signal strength of the interference signal 128, along with the corresponding communication rate or the serving detail 118.

Continuing with the example, the capacity block 706 can generate the receiver capacity function 302 as a relationship or a pattern between various values of the interference communication capacity 205 and the serving communication capacity 203 based on the stored information regarding previous communications. The capacity block 706 can utilize method or process predetermined by the computing system 100 in generating the receiver capacity function 302 from stored information.

Also for example, the capacity block 706 can determine the receiver capacity function 302 based on identifying the receiver capacity function 302 corresponding to the receiving device. As a more specific example, the capacity block 706 can look-up or download the receiver capacity function 302 corresponding to the receiving device, such as the first user device 102. Also as a more specific example, the capacity block 706 can search or access the receiver capacity function 302 stored in the first storage unit 524, the second storage unit 546, the third storage unit 624, the fourth storage unit 646, or a combination thereof.

The capacity block 706 can further determine information describing the receiving device by determining the serving-interference metric 150 of FIG. 1. The capacity block 706 can determine the serving-interference metric 150 for representing the receiving device including the interference-aware receiver 146 receiving and processing the receiver signal 126. For example, the capacity block 706 can determine the serving-interference metric 150 for describing or representing the first user device 102, the second user device 104, the first node device 106, the second node device 108, or a combination thereof receiving the receiver signal 126.

The capacity block 706 can determine the serving-interference metric 150 based on the receiver capacity function 302. The capacity block 706 can determine the serving-interference metric 150 as an instance or a value of the serving communication capacity 203, an instance or a value of the interference communication capacity 205, or a combination thereof corresponding to the receiver capacity function 302.

The capacity block 706 can determine the serving-interference metric 150 in a variety of ways. For example, the capacity block 706 can determine the serving-interference metric 150 including the receiver capacity function 302 in its entirety, the modulation rate set 304 of FIG. 3, the dynamic coordinate, the corresponding serving rate 308 of FIG. 3, or a combination thereof. The capacity block 706 can determine the serving-interference metric 150 including the dynamic interference point 310 of FIG. 3, the dynamic serving point 312 of FIG. 3, the corresponding serving rate 308 associated with the designated interference rate 306 of FIG. 3, or a combination thereof.

The capacity block 706 can utilize the designated interference rate 306 representing a value or instance of the interference communication rate predetermined by the computing system 100. The capacity block 706 can use the designated interference rate 306 as input to the receiver capacity function 302. The capacity block 706 can calculate for an output corresponding to the designated interference rate 306 according to the receiver capacity function 302. The capacity block 706 can set the resulting output value or instance of the serving communication capacity 203 as the corresponding serving rate 308.

The capacity block 706 can further generate or calculate the dynamic coordinate including the dynamic interference point 310 and the dynamic serving point 312. The capacity block 706 can generate or calculate the dynamic coordinate based on a characteristic or a trait for the receiver capacity function 302.

For example, the capacity block 706 can generate or calculate the dynamic coordinate as the coordinate on the receiver capacity function 302 corresponding to a slope, a first or second derivative result, or a combination thereof predetermined by the computing system 100. Also for example, the capacity block 706 can generate or calculate the dynamic coordinate relative to a highest value, a lowest value, a mean or a median value, or a combination thereof for the receiver capacity function 302.

As a more specific example, the capacity block 706 can generate or calculate the dynamic interference point 310 and the dynamic serving point 312 as a specific relative or statistical metric, within a certain percentage, based on an offset value, based on a spread or a width, or a combination thereof. The capacity block 706 can include a method or a process predetermined for generating or calculating the dynamic interference point 310.

The capacity block 706 can determine the serving-interference metric 150 for communicating the serving-interference metric 150 to the transmitting device through the feedback signal 148 of FIG. 1. For example, the capacity block 706 can determine the serving-interference metric 150 including one or more pairings of the dynamic interference point 310 and the dynamic serving point 312 for representing the interference-aware receiver 146 processing the serving signal 116 along with the interference signal 128.

Also for example, the capacity block 706 can determine the serving-interference metric 150 including one or more instance of the corresponding serving rate 308 each associated with the designated interference rate 306 predetermined by the computing system 100. Also for example, the capacity block 706 can determine the serving-interference metric 150 including a combination of one or pairings of the dynamic interference point 310 and the dynamic serving point 312 along with one or more instance of the corresponding serving rate 308.

The capacity block 706 can determine the serving-interference metric 150 for controlling or adjusting the serving detail 118 for communicating the serving signal 116, for controlling or adjusting the interference detail 132 for communicating the interference signal 128, or a combination thereof based on the feedback signal 148. The transmitting device or the scheduling device can control or adjust the serving detail 118, the interference detail 132, or a combination thereof for subsequent communications based on the serving-interference metric 150.

It has been discovered that the receiver capacity function 302 determined at the receiving device provides increased efficiency. The receiver capacity function 302 can accurately characterize the ability or the capability of the interference-aware receiver 146 for various communication environments. The receiver capacity function 302 can be used to communicate the ability or the capability to other devices in the computing system 100 to adjust the communication environment, including the interference signal 128 or the serving signal 116, to fully utilize the interference-aware receiver 146.

It has further been discovered that the serving-interference metric 150 based on the receiver capacity function 302 provides accurate representation of receivers for the computing system 100. The serving-interference metric 150 can accurately communicate the ability or the capability of the interference-aware receiver 146 to other devices. The accurate characterization or representation of the interference-aware receiver 146 at other devices can be used to adjust the serving detail 118 or anticipate the interference detail 132 for receivers served by the transmitters.

It has further been discovered that the serving-interference metric 150 including the dynamic interference point 310 and the dynamic serving point 312 provides increased accuracy tailored for individual instances of the interference-aware receiver 146. The dynamic interference point 310 and the dynamic serving point 312 generated by the interference-aware receiver 146 can be used to accurately describe or represent the receiver capacity function 302. The receiving device can determine the location or coordinate on the receiver capacity function 302 that best represents the receiver capacity function 302, such as transition points, meaningful characteristics, or a combination thereof.

It has further been discovered that the serving-interference metric 150 including the corresponding serving rate 308 associated with the designated interference rate 306 provides efficient communication for representing the receiving device. The serving-interference metric 150 including the corresponding serving rate 308 associated with the designated interference rate 306 predetermined and known within the computing system 100 can minimize the bandwidth or the resources required to communicate the serving-interference metric 150. The corresponding serving rate 308 can be sufficient in representing the interference-aware receiver 146 to other devices for based on the determination for the designated interference rate 306.

The capacity block 706 can determine information appropriate for describing the receiving device using the first communication unit 516, the second communication unit 536, the third communication unit 616, the fourth communication unit 636, the first control unit 512, the second control unit 534, the third control unit 612, the fourth control unit 634, or a combination thereof. The capacity block 706 can store the receiver capacity function 302, the modulation rate set 304, dynamic coordinate, the corresponding serving rate 308, or a combination thereof in the first communication unit 516, the second communication unit 536, the third communication unit 616, the fourth communication unit 636, the first storage unit 514, the second storage unit 546, the third storage unit 614, the fourth storage unit 646, or a combination thereof.

After determining information appropriate for describing the receiving device, the control flow can be passed from the capacity block 706 to the feedback block 708. The control flow can pass similarly as described above between the receiver block 704 and the capacity block 706 but using processing results of the capacity block 706, such as the receiver capacity function 302, the modulation rate set 304, dynamic coordinate, the corresponding serving rate 308, or a combination thereof.

The feedback block 708 is configured to communicate the serving-interference metric 150 between the receiving device and the transmitting device. The feedback block 708 can generate the feedback signal 148 including the serving-interference metric 150.

The feedback block 708 can further transmit, receiver, or a combination thereof for the feedback signal 148 including the serving-interference metric 150. For example, the feedback block 708 can transmit, receiver, or a combination thereof with respect to the first user device 102, the second user device 104, the first node device 106, the second node device 108, or a combination thereof. As a more specific example, the feedback block 708 can transmit from the user device, including the first user device 102, to a corresponding transmitting device, including the first node device 106.

The feedback block 708 can transmit the feedback signal 148 including the serving-interference metric 150 according to the one-shot mechanism 402 of FIG. 4 or the incremental mechanism 404 of FIG. 4. The feedback block 708 can transmit the serving-interference metric 150 using one or a multiple instances of the feedback slot 406 of FIG. 4.

For example, the feedback block 708 can transmit the dynamic interference point 310 for the first slot 408 of FIG. 4 and the dynamic serving point 312 for the second slot 410. Also for example, the feedback block 708 can transmit a portion of the corresponding serving rate 308, the dynamic serving point 312, or the dynamic interference point 310 in the first slot 408 and remain portion or a further portion thereof in the second slot 410.

Also for example, the feedback block 708 can transmit one or more instances of the corresponding serving rate 308 in the first slot 408 and the dynamic serving point 312 and the dynamic interference point 310 in the second slot 410. Also for example, the feedback block 708 can transmit the serving-interference metric 150 for different receiving devices.

As a more specific example, the feedback block 708 can transmit the serving-interference metric 150 for the first user device 102 in the first slot 408 and transmit the serving-interference metric 150 for the second user device 104 in the second slot 410. The feedback block 708 can designate or coordinate a pattern or a sequence for the receiving devices for communicating the feedback signal 148. Each of the devices can communicate the serving-interference metric 150 in its entirety or a portion thereof in each transmission within the feedback slot 406 as described above.

It has been discovered that the feedback signal 148 including the serving-interference metric 150 provides accurate representation of receivers throughout the computing system 100. The feedback signal 148 including the serving-interference metric 150 can accurately communicate the ability or the capability of the interference-aware receiver 146 to other devices. The accurate characterization or representation of the interference-aware receiver 146 at other devices can be used to adjust the serving detail 118 or anticipate the interference detail 132 for receivers served by the transmitters It has further been discovered that the one-shot mechanism 402 utilizing one instance of the feedback slot 406 to communicate the serving-interference metric 150 provides immediate updates and real-time knowledge regarding the receiving device. Entirety of the serving-interference metric 150 communicated in one instance of the feedback slot 406 can quickly communicate any changes in the serving-interference metric 150 or rapidly account for any new receivers. The increased speed in the update can further provide faster improvement in efficiency for the communication system 100.

It has further been discovered that the incremental mechanism 404 utilizing multiple instances of the feedback slot 406 to communicate the serving-interference metric 150 provides efficient use of the resources and increased capacity to communicate with increased number of receivers. The incremental mechanism 404 utilizing multiple instances of the feedback slot 406 to communicate the serving-interference metric 150 can be used to share the resources, such as bandwidth, to accommodate for feedback from increased number of receivers.

Communicating part of the serving-interference metric 150 for each slot can minimize the amount of information communicated within each slot. Further the accuracy for representing the interference-aware receiver 146 can be increased since communication of the serving-interference metric 150 is not limited to one slot but can utilize multiple slots.

The feedback block 708 can use the first communication unit 516, the second communication unit 536, the third communication unit 616, the fourth communication unit 636, the first control unit 512, the second control unit 534, the third control unit 612, the fourth control unit 634, or a combination thereof to generate the feedback signal 148 including the serving-interference metric 150. The feedback block 708 can use the first inter-device interface 517, the second inter-device interface 537, the third inter-device interface 617, the fourth inter-device interface 637, or a combination thereof to communicate the feedback signal 148 including the serving-interference metric 150.

After communicating the feedback signal 148 including the serving-interference metric 150, the control flow can be passed from the feedback block 708 to the management block 710. The control flow can pass similarly as described above between the receiver block 704 and the capacity block 706 but using processing results of the feedback block 708, such as the feedback signal 148 including the serving-interference metric 150.

The management block 710 is configured to control the serving detail 118 based on the feedback signal including the feedback signal 148 including the serving-interference metric 150. The management block 710 can use the first inter-device interface 517, the second inter-device interface 537, the third inter-device interface 617, the fourth inter-device interface 637, or a combination thereof to communicate, such as for transmitting or receiving, the feedback signal 148. For example, the management block 710 can use the second inter-device interface 537 to receive the feedback signal 148 at the first node device 106, the fourth inter-device interface 637 to receive the feedback signal 148 at the second node device 108, or a combination thereof.

The management block 710 can receive the feedback signal 148 including the serving-interference metric 150 representing the interference-aware receiver 146 processing the receiver signal 126 corresponding to the serving signal 116 contemporaneous with the interference signal 128. The management block 710 can receive the serving-interference metric 150 communicated through one or multiple instances of the feedback slot 406 as described above.

The management block 710 can generate the communication rate profile 202, the receiver capacity function 302, or a combination thereof based on the serving-interference metric 150 for describing or characterizing the interference-aware receiver 146 intended for communication. For example, the management block 710 can generate or approximate the communication rate profile 202, the receiver capacity function 302, or a combination thereof using a function approximation mechanism 712.

The function approximation mechanism 712 is a method or a process for utilizing one or a group of points to generate a specific function or curve. The function approximation mechanism 712 can include the method or the process for generating or approximating the communication rate profile 202, the receiver capacity function 302, or a combination thereof based on one or a grouping of points or coordinates represented by the serving-interference metric 150.

As a specific example, the function approximation mechanism 712 can generate the communication rate profile 202, the receiver capacity function 302, or a combination thereof based on:

$$C_i^{IF} = \log_2 \det \left| I + \frac{P_i}{M\sigma^2} H_{i,i} H_{i,i}^H \right|.$$ Equation (5)

The interference-free rate 208 can be represented as '$C_i^{IF}$'. Similarly, the function approximation mechanism 712 can generate the communication rate profile 202, the receiver capacity function 302, or a combination thereof based on the partial-recognition rate 210, the interference-whitening rate 212, other values corresponding thereto, or a combination thereof.

The management block 710 can use the serving-interference metric 150 as an input to the function approximation mechanism 712 to generate or approximate the communication rate profile 202, the receiver capacity function 302, or a combination thereof at the node device or the schedule device. The management block 710 can use serving-interference metric 150 communicate in one instance of the feedback slot 406 or over time through multiple instances of the feedback slot 406 to generate or approximate the communication rate profile 202, the receiver capacity function 302, or a combination thereof.

Also for example, the management block 710 can generate or approximate the communication rate profile 202, the receiver capacity function 302, or a combination thereof based on multiple instances of the serving-interference metric 150 corresponding to the interference-aware receiver 146 communicated over time. The management block 710 can store instances of the serving-interference metric 150, the CQI feedback and corresponding interference information, the CSI information or a combination thereof for each instance of the receiving device.

Continuing with the example, the management block 710 can use the stored information for various communication environment to generate or approximate the communication rate profile 202, the receiver capacity function 302, or a combination thereof. The management block 710 can use the stored information to generate, approximate, or update the communication rate profile 202, the receiver capacity function 302, or a combination thereof similar to the capacity block 706 generating the receiver capacity function 302 as a relationship or a pattern between various stored values.

The management block 710 can use the communication rate profile 202, the receiver capacity function 302, or a combination thereof at the transmitting device or the scheduling device, such as the first node device 106 or the second node device 108, to represent one or more of the communicating receivers. The management block 710 can control or determine the serving detail 118 based on the communication rate profile 202, the receiver capacity function 302, or a combination thereof to maximize the efficiency of the communications.

The management block 710 can use a rate-modulation mechanism 714 for determining the serving detail 118. The rate-modulation mechanism 714 is a method or a process for generating the modulation function 314 of FIG. 3 from the serving-interference metric 150, the receiver capacity function 302, the communication rate profile 202, or a combination thereof.

The rate-modulation mechanism 714 can determine the interference modulation 136 corresponding to various values or instances of the interference communication capacity 205. The rate-modulation mechanism 714 can generate the modulation function 314 based on a relationship between the interference modulation 136 and the serving communication capacity 203. The rate-modulation mechanism 714 can determine the interference modulation 136 based on the modulation set 124 of FIG. 1. The rate-modulation mechanism 714 can map the various communication rates to the modulations available in the modulation set 124.

The computing system 100 can use the modulation function 314 to determine the serving detail 118, the interference detail 132, or a combination thereof. For example, the management block 710 can adjust the serving detail 118 in response to the interference detail 132. Also for example, the management block 710 can use the modulation function 314 to coordinate setting or adjusting for the serving detail 118, the interference detail 132, or a combination thereof.

The management block 710 can further utilize the node link 114 of FIG. 1 to exchange information between transmitters, scheduling devices, or a combination thereof for coordinating the communications. The management block 710 can coordinate simultaneous transmission of signals based on controlling or determining the serving detail 118 for multiple instances of the serving signal 116 across multiple transmitting devices. The management block 710 can control or determine the serving detail 118 along with the interference detail 132 based on coordinating through the node link 114.

It has been discovered that the communication rate profile 202 for the interference-aware receiver 146 at the transmitting device provides increased efficiency in overall communication for the computing system 100. The communication rate profile 202 available at the transmitting device or the scheduling device, including the first node device 106 or the second node device 108, can accurately represent the receivers for the communications. The transmitting device or the scheduling device can utilize the communication rate profile 202 to adjust the serving detail 118 for one or more transmissions to optimize simultaneous communications and resulting interferences.

It has further been discovered that coordinating the serving detail 118 for multiple simultaneous instances of the serving signal 116 intended for multiple receivers based on the communication rate profile 202 resulting from the serving-interference metric 150 provides increased overall communication speed. The coordination can reduce the interferences, which can lead to reduction in processing errors and increase in overall communication rate. The computing system 100 can use the node link 114 to communicate the serving-interference metric 150 or coordinate, which can optimize over multiple cells and reduce interferences across multiple cells.

It has further been discovered that the communication rate profile 202 based on CQI and CSI over period of time provides efficient communication for the computing system 100. The transmitter or the scheduling device can characterize the receiver using data collected over time, regardless of whether it includes the interference-aware receiver 146, with or without using the serving-interference metric 150. The computing system 100 can utilize the characterization or the representation to identify specific receivers and coordinate communications efficiently utilizing the capability of the specific devices.

Figure 8:
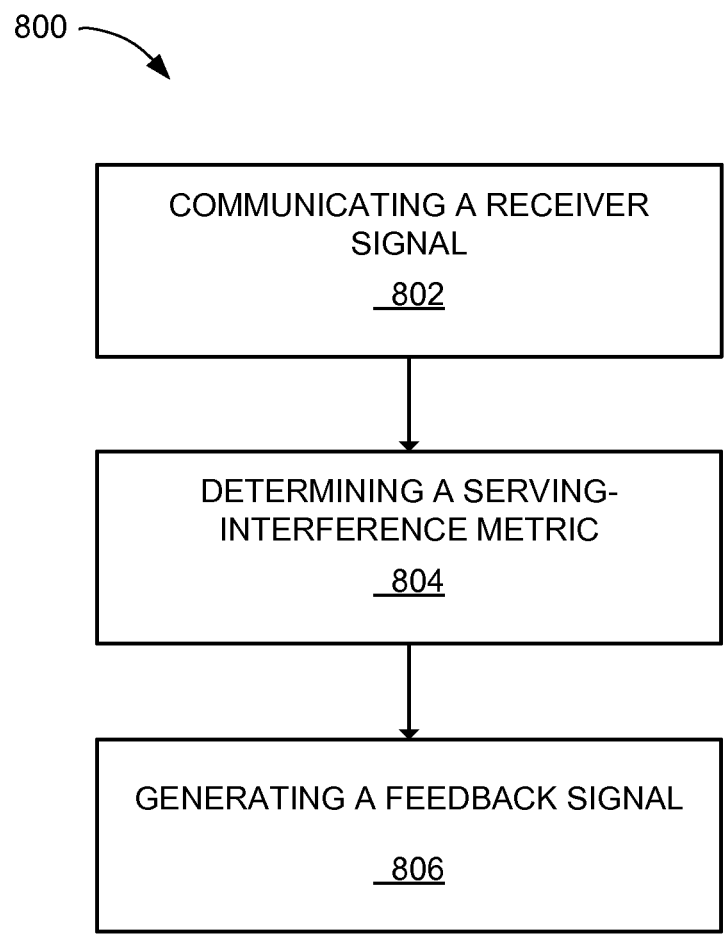
FIG. 8 is a flow chart of a method of operation of a computing system in a further embodiment of the present invention.

Referring now to FIG. 8, therein is shown a flow chart 800 of a method of operation of a computing system in a further embodiment of the present invention. The method 800 includes: communicating a receiver signal corresponding to serving signal contemporaneous with an interference signal from an interference source at an interference-aware receiver in a block 802; determining a serving-interference metric with a communication unit for describing capability of the interference-aware receiver associated with serving communication capacity and interference communication capacity in a block 804; and generating a feedback signal including the serving-interference metric for communicating the feedback signal to a node device in a block 806.

The blocks described in this application can be hardware implementation or hardware accelerators, including passive circuitry, active circuitry, or both, in the first communication unit 516 of FIG. 5, the second communication unit 536 of FIG. 5, the third communication unit 616 of FIG. 6, the fourth communication unit 636 of FIG. 6, the first control unit 512 of FIG. 5, the second control unit 538 of FIG. 5, the third control unit 612 of FIG. 6, the fourth control unit 638 of FIG. 6, or a combination thereof. The blocks can also be hardware implementation or hardware accelerators, including passive circuitry, active circuitry, or both, within the first user device 102 of FIG. 1, the second user device 104 of FIG. 1, the first node device 106 of FIG. 1, the second node device 108 of FIG. 1, or a combination thereof but outside of the first communication unit 516, the second communication unit 536, the third communication unit 616, the fourth communication unit 636, the first control unit 512, the second control unit 534, the third control unit 612, the fourth control unit 634, or a combination thereof.

The computing system 100 of FIG. 1 has been described with block functions or order as an example. The computing system 100 can partition the blocks differently or order the blocks differently. For example, the capacity block 706 of FIG. 7 can be implemented as one block generating the receiver capacity function 302 of FIG. 3 and a different block determining the serving-interference metric 150 of FIG. 1. Also for example, the capacity block 706 and the feedback block 708 of FIG. 7 can be combined.

For illustrative purposes, the various blocks have been described as being specific to the first user device 102, the second user device 104, the first node device 106, the second node device 108, or a combination thereof. However, it is understood that the blocks can be distributed differently. For example, the various blocks can be implemented in a different device, or the functionalities of the blocks can be distributed across multiple devices. Also as an example, the various blocks can be stored in a non-transitory memory medium.

As a more specific example, one or more blocks described above can be stored in the non-transitory memory medium for distribution to a different system, a different device, a different user, or a combination thereof, for manufacturing, or a combination thereof. Also as a more specific example, the blocks described above can be implemented or stored using a single hardware unit, such as a chip or a processor, or across multiple hardware units.

The blocks described in this application can be stored in the non-transitory computer readable medium. The first communication unit 516, the second communication unit 536, the third communication unit 616, the fourth communication unit 636, the first control unit 512, the second control unit 534, the third control unit 612, the fourth control unit 634, or a combination thereof can represent the non-transitory computer readable medium. The first communication unit 516, the second communication unit 536, the third communication unit 616, the fourth communication unit 636, the first control unit 512, the second control unit 534, the third control unit 612, the fourth control unit 634, or a combination thereof, or a portion therein can be removable from the first user device 102, the second user device 104, the first node device 106, the second node device 108, or a combination thereof. Examples of the non-transitory computer readable medium can be a non-volatile memory card or stick, an external hard disk drive, a tape cassette, or an optical disk.

The physical transformation of the receiver signal 126 of FIG. 1 from the serving-interference metric 150 results in the movement in the physical world, such as content displayed or recreated for the user on the first user device from processing the serving content therein. The content reproduced on the first user device 102, such as navigation information or voice signal of a caller, can influence the user's movement, such as following the navigation information or replying back to the caller. Movement in the physical world results in changes to the channel measures, the geographic location of the first user device 102, interfering transmissions, or a combination thereof, which can be fed back into the computing system 100 through the feedback signal 148 of FIG. 1 and influence the serving detail 118 of FIG. 1, the interference detail 132 of FIG. 1, or a combination thereof for subsequent communications.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
   an inter-device interface configured to receive receiver signal corresponding to serving signal contemporaneous with interference signal from an interference source at a user device including an interference-aware receiver;
   a communication unit, coupled to the inter-device interface, configured to:
      determine a serving-interference metric for describing processing capability of the interference-aware receiver to detect and decode interference content of the interference signal in processing for serving content, wherein:
the serving-interference metric includes one or more of a dynamic interference point, a dynamic serving point, and a corresponding serving rate associated with a designated interference rate, and
the serving-interference metric is associated with serving communication capacity and interference communication capacity, and
generating a feedback signal including the serving-interference metric for communicating the feedback signal to a node device in one of a one-shot, a multi-shot, and iteratively.

2. The system as claimed in claim 1 wherein the inter-device interface is configured to transmit the feedback signal including the serving-interference metric using one instance of a feedback slot.

3. The system as claimed in claim 1 wherein the inter-device interface is configured to transmit the feedback signal including the serving-interference metric using multiple feedback slots.

4. The system as claimed in claim 1 wherein the communication unit is configured to determine the serving-interference metric for controlling serving detail for communicating the serving signal, for controlling interference detail for communicating the interference signal, or a combination thereof.

5. The system as claimed in claim 1 wherein:
the communication unit is configured to determine the serving-interference metric based on a receiver capacity function for representing the user device including the interference-aware receiver.

6. The system as claimed in claim 5 wherein:
the communication unit is configured to determine the serving-interference metric including the dynamic interference point and the dynamic serving point for representing the interference-aware receiver processing the serving signal along with the interference signal; and
the inter-device interface is configured to transmit the feedback signal including the serving-interference metric using multiple feedback slots.

7. The system as claimed in claim 5 wherein:
the communication unit is configured to determine the serving-interference metric including the dynamic interference point and the dynamic serving point for representing the interference-aware receiver processing the serving signal along with the interference signal; and
the inter-device interface is configured to transmit the feedback signal including the serving-interference metric using one instance of feedback slot.

8. The system as claimed in claim 5 wherein:
the communication unit is configured to determine the serving-interference metric including the corresponding serving rate associated with the designated interference rate predetermined by the computing system for representing the interference-aware receiver processing the serving signal along with the interference signal; and
the inter-device interface is configured to transmit the feedback signal including the serving-interference metric using multiple feedback slots.

9. The system as claimed in claim 5 wherein:
the communication unit is configured to determine the serving-interference metric including the corresponding serving rate associated with the designated interference rate predetermined by the computing system for representing the interference-aware receiver processing the serving signal along with the interference signal; and
the inter-device interface is configured to transmit the feedback signal including the serving-interference metric using one instance of feedback slot.

10. A method of operation of a computing system comprising:
receiving receiver signal corresponding to serving signal contemporaneous with interference signal from an interference source at a user device including an interference-aware receiver;
determining a serving-interference metric with a communication unit for describing processing capability of the interference-aware receiver to detect and decode interference content of the interference signal in processing for serving content, wherein:
the serving-interference metric includes one or more of a dynamic interference point, a dynamic serving point, and a corresponding serving rate associated with a designated interference rate, and
the serving-interference metric is associated with serving communication capacity and interference communication capacity; and
generating a feedback signal including the serving-interference metric for communicating the feedback signal to a node device in one of a one-shot, a multi-shot, and iteratively.

11. The method as claimed in claim 10 further comprising transmitting the feedback signal including the serving-interference metric using one instance of a feedback slot.

12. The method as claimed in claim 10 further comprising transmitting the feedback signal including the serving-interference metric using multiple feedback slots.

13. The method as claimed in claim 10 wherein determining the serving-interference metric includes determining the serving-interference metric for controlling serving detail for communicating the serving signal, for controlling interference detail for communicating the interference signal, or a combination thereof.

14. The method as claimed in claim 10 wherein:
determining the serving-interference metric includes determining the serving-interference metric based on a receiver capacity function for representing the user device including the interference-aware receiver.

15. The method as claimed in claim 14 wherein:
determining the serving-interference metric includes determining the serving-interference metric including the dynamic interference point and the dynamic serving point, the corresponding serving rate associated with the designated interference rate predetermined by the computing system, or a combination thereof for representing the interference-aware receiver processing the serving signal along with the interference signal; and
further comprising:
transmitting the feedback signal including the serving-interference metric using one or multiple feedback slots.

16. A computing system comprising:
an inter-device interface configured to communicate a feedback signal in one of a one-shot, a multi-shot and iteratively, the feedback signal including a serving-interference metric for representing an interference-aware receiver detecting and decoding interference content of interference signal in processing receiver signal, corresponding to serving signal contemporaneous with the interference signal, wherein the serving-interference metric includes one or more of a dynamic interference point, a dynamic serving point, and a corresponding serving rate associated with a designated interference rate;

a communication unit, coupled to the inter-device interface, configured to:
generate a communication rate profile based on the serving-interference metric for describing the interference-aware receiver, and
determine serving detail based on the communication rate profile for communicating serving content to the interference-aware receiver.

17. The system as claimed in claim 16 wherein:
the inter-device interface is configured to receive the feedback signal including the serving-interference metric communicated through one feedback slot; and
the communication unit is configured to generate the communication rate profile using function approximation mechanism based on the serving-interference metric communicated through one instance of the feedback slot.

18. The system as claimed in claim 16 wherein:
the inter-device interface is configured to receive the feedback signal including the serving-interference metric communicated through multiple feedback slots; and
the communication unit is configured to generate the communication rate profile based on the serving-interference metric communicated through multiple instances of the feedback slots over time.

\* \* \* \* \*